United States Patent
Kalaboukis et al.

(10) Patent No.: US 10,929,841 B1
(45) Date of Patent: Feb. 23, 2021

(54) SYSTEMS AND METHODS FOR PROVIDING AN ADAPTABLE MOBILE WALLET WITH SUB-WALLETS

(71) Applicant: Wells Fargo Bank, N.A., San Francisco, CA (US)

(72) Inventors: Chris Kalaboukis, San Jose, CA (US); Laurence Poirier, La Honda, CA (US); Ramanathan Ramanathan, Bellevue, WA (US); John Wright, Benicia, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 439 days.

(21) Appl. No.: 15/651,914

(22) Filed: Jul. 17, 2017

(51) Int. Cl.
*G06Q 20/36* (2012.01)
*G06Q 20/32* (2012.01)

(52) U.S. Cl.
CPC ......... *G06Q 20/363* (2013.01); *G06Q 20/322* (2013.01)

(58) Field of Classification Search
CPC ........................... G06Q 20/363; G06Q 20/322
USPC .......................................................... 705/41
See application file for complete search history.

(56) References Cited

U.S. PATENT DOCUMENTS

| | | |
|---|---|---|
| 7,413,113 B1 | 8/2008 | Zhu |
| 8,442,914 B2 | 5/2013 | Killian et al. |
| 8,459,544 B2 | 6/2013 | Casey et al. |
| 8,977,569 B2 | 3/2015 | Rao |
| 9,195,994 B1 | 11/2015 | Ellis et al. |
| 9,208,488 B2 | 12/2015 | Liberty |
| 9,256,871 B2 | 2/2016 | Anderson et al. |
| 9,275,387 B1 | 3/2016 | Spector et al. |
| 9,424,572 B2 | 8/2016 | Bondesen et al. |
| 10,546,289 B1* | 1/2020 | Maeng ................... G06Q 20/32 |
| 2009/0037326 A1 | 2/2009 | Chitti et al. |
| 2012/0074232 A1 | 3/2012 | Spodak et al. |
| 2014/0172700 A1 | 6/2014 | Teuwen et al. |
| 2014/0188718 A1 | 7/2014 | Grossman et al. |
| 2014/0195425 A1* | 7/2014 | Campos ................. G06Q 20/20 705/41 |
| 2014/0344149 A1* | 11/2014 | Campos ................. G06Q 20/36 705/41 |

(Continued)

OTHER PUBLICATIONS

Anonymous; "Mobile Commerce"; OECD Digital Economy Papers; Paris, Iss. 124. (Year: 2007).*

*Primary Examiner* — Edward Chang
(74) *Attorney, Agent, or Firm* — Foley & Lardner LLP

(57) ABSTRACT

A computer-implemented method includes registering, by a mobile wallet computing system, a plurality of items to a master wallet held by a user, wherein the master wallet is associated with a mobile wallet on a user mobile device; registering one or more sub-wallets for the user, wherein each sub-wallet includes one or more of the items registered to the master wallet; and configuring one or more rules for each sub-wallet, wherein the one or more rules for a given sub-wallet define when the mobile wallet computing system provisions the given sub-wallet to the mobile wallet. The method also includes monitoring a context of the user; determining whether the one or more rules for each sub-wallet are fulfilled, based on the monitored context of the user; and in response to at least one rule associated with a predefined sub-wallet being fulfilled, provisioning the predefined sub-wallet to the mobile wallet.

18 Claims, 7 Drawing Sheets

(56) References Cited

U.S. PATENT DOCUMENTS

| | | |
|---|---|---|
| 2014/0372298 A1 | 12/2014 | Singh et al. |
| 2015/0058146 A1* | 2/2015 | Gaddam .............. G06Q 20/322 |
| | | 705/21 |
| 2015/0220914 A1 | 8/2015 | Purves et al. |
| 2015/0254698 A1 | 9/2015 | Bondesen et al. |
| 2015/0348018 A1* | 12/2015 | Campos ................ G06Q 20/36 |
| | | 705/41 |
| 2016/0125386 A1* | 5/2016 | Desai ........................ G06F 8/60 |
| | | 705/41 |
| 2016/0358180 A1* | 12/2016 | Van Os .................. G06Q 20/08 |
| 2019/0266604 A1* | 8/2019 | Desai ..................... G06Q 20/40 |

* cited by examiner

SYSTEMS AND METHODS FOR PROVIDING AN ADAPTABLE MOBILE WALLET WITH SUB-WALLETS

TECHNICAL FIELD

Embodiments of the present disclosure relate generally to the field of mobile wallets.

BACKGROUND

Payments for products and services are often completed using credit cards, debit cards, checks, and/or cash. At the same time, most people carry some type of mobile device. Electronic-based transactions may be carried out using a mobile device. For example, mobile device users may purchase goods and services through payment applications at point-of-sale terminals. Beneficially, using a mobile device to make payments at point-of-sale terminals may alleviate or reduce the need to carry cash or payment cards (e.g., credit cards), which some users may find appealing.

SUMMARY

One embodiment relates to a computer-implemented method. The method includes registering, by a mobile wallet computing system, a plurality of items to a master wallet held by a user, wherein the master wallet is associated with a mobile wallet on a user mobile device; registering, by the mobile wallet computing system, one or more sub-wallets for the user, wherein each sub-wallet includes one or more of the items registered to the master wallet; and configuring, by the mobile wallet computing system, one or more rules for each sub-wallet, wherein the one or more rules for a given sub-wallet define when the mobile wallet computing system provisions the given sub-wallet to the mobile wallet on the user mobile device. The method further includes monitoring, by the mobile wallet computing system, a context of the user; determining, by the mobile wallet computing system, whether the one or more rules for each sub-wallet are fulfilled, based on the monitored context of the user; and in response to at least one of the rules associated with a predefined sub-wallet being fulfilled, provisioning, by the mobile wallet computing system, the predefined sub-wallet to the mobile wallet on the user mobile device.

Another embodiment relates to a mobile wallet computing system comprising a processor coupled to non-transitory machine readable storage media having instructions stored thereon. When executed by the processor, the instructions cause the mobile wallet computing system to register a plurality of items to a master wallet held by a user, wherein the master wallet is associated with a mobile wallet on a user mobile device; register one or more sub-wallets for the user, wherein each sub-wallet includes one or more of the items registered to the master wallet; and configure one or more rules for each sub-wallet, wherein the one or more rules for a give sub-wallet define when the mobile wallet computing system provisions the given sub-wallet to the mobile wallet on the user mobile device. When executed by the processor, the instructions further cause the mobile wallet computing system to monitor a context of the user; determine whether the one or more rules for each sub-wallet are fulfilled, based on the monitored context of the user; and in response to at least one of the rules associated with a predefined sub-wallet being fulfilled, provision the predefined sub-wallet to the mobile wallet on the user mobile device.

Another embodiment relates to a mobile device. The mobile device includes a network interface structured to communicate data over a network, a display, a processor, and a memory coupled to the processor. The memory has a mobile wallet application stored thereon, the mobile wallet application including instructions executable by the processor that cause the processor to gather information relating to a plurality of items that a user wishes to register to a mobile wallet held by the user, wherein the master wallet is associated with the mobile wallet application, and transmit the gathered information to a mobile wallet computing system. The instructions also cause the processor to receive user input relating to one or more sub-wallets the user wishes to register with the mobile wallet computing system, wherein each sub-wallet includes one or more items registered to the master wallet; receive user input relating to one or more rules that the user wishes to configure for each sub-wallet, wherein the one or more rules define when the mobile wallet computing system provisions each sub-wallet to the mobile wallet application; and transmit the user input relating to the one or more sub-wallets and the user input relating to the one or more rules for each sub-wallet to the mobile wallet computing system. The instructions further cause the processor to monitor a context of the user and transmit information relating to the context to the mobile wallet computing system, in response to transmitting the information relating to the context, receive one or more tokens relating to a sub-wallet from the mobile wallet computing system, and display one or more user interfaces relating to the received sub-wallet on the display.

DETAILED DESCRIPTION

Figure 1:
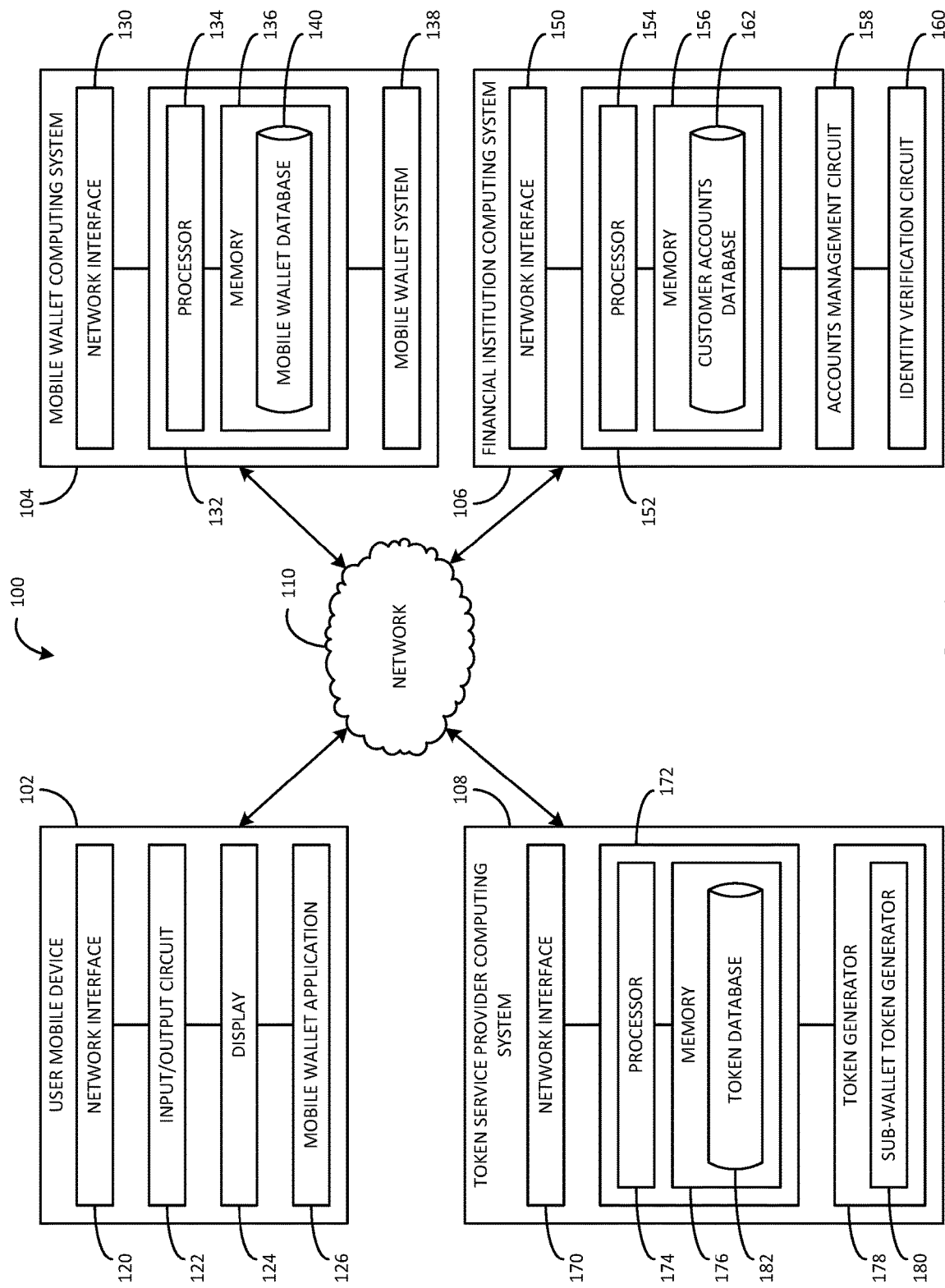
FIG. 1 is a system for providing an adaptable mobile wallet with sub-wallets, according to an example embodiment.

Referring to the Figures generally, various systems, methods, and apparatuses for providing an adaptable mobile wallet with sub-wallets are described herein. In various embodiments, a mobile device of a user includes a mobile wallet that is associated with a mobile wallet account held by the user. As described in more detail below, a "mobile wallet" is a digital wallet provided on a user's mobile device. The digital wallet may include payment capabilities, such as the ability to use a communication protocol (e.g., near-field communication) at a point-of-sale terminal to transfer payment information and enable the purchase of a good or service. The digital wallet may further store various items that the user may wish to be able to display to a third party using the user's mobile device, such as a ticket, a boarding pass, a coupon, and so on. Additionally, the digital wallet may include many other capabilities, functions, and features that are described below in more detail.

In the embodiments described herein, the mobile wallet is "predominantly empty," which is used herein to signify that the data relating to various items stored in the user's mobile wallet account (e.g., payment vehicles, rewards cards, loyalty cards, identification cards, passes, tickets, etc.) are not stored on the mobile device. Rather, the data is predominantly stored on a remote data-storage facilities (e.g., cloud servers), and only some of the data is temporarily stored locally in the mobile wallet of the mobile device. As described herein, the user may store items in a "master wallet," which is contained, located, or otherwise disposed in the remote server system, and configure one or more "sub-wallets" with subsets of the items stored to the master wallet. Accordingly, the mobile device may temporarily download one or more sub-wallets to the mobile wallet on the mobile device, based on whether rules associated with the sub-wallets are fulfilled, such that the user may make a payment using a payment vehicle stored in a given downloaded sub-wallet.

As used herein, the term "payment vehicle" refers to any card, account, or any other currency-attached object, virtual file, or database from which a user can transfer funds to another entity. Example payment vehicles include bank accounts, (e.g., checking accounts and savings accounts), other user accounts (e.g., flexible spending accounts, IRA accounts, health savings accounts, investment accounts, and the like), transaction cards (e.g., gift cards, credit cards, debit cards), and financial rewards (e.g., cash back, rewards points, and the like).

An example implementation may be described as follows. A user registers a mobile wallet account with a mobile wallet computing system. The mobile wallet account is associated with a mobile wallet running on a mobile device of the user. The mobile wallet is configured to store mobile wallet data for the user on the user's mobile device. "Mobile wallet data" is used herein to refer to the information relating to any items that the user has registered with the mobile wallet computing system. For example, mobile wallet data may include the user's payment card information. However, rather than being constantly populated with mobile wallet data, the mobile wallet is predominantly empty. Subsequently, the user creates a master wallet with the mobile wallet computing system. As used herein, a "master wallet" refers to the repository for the items registered by the user with the mobile wallet computing system. Accordingly, the user uploads various items, such as information for payment cards, rewards cards, loyalty cards, identification cards, passes, reservations, and so on, to the master wallet. However, instead of being stored on the user's mobile device, the master wallet is stored in remote data-storage facilities (e.g., on cloud servers).

The user then creates one or more sub-wallets with the mobile wallet computing system. As used herein, a "sub-wallet" is a subset of the items stored in the master wallet and may be centered around a particular theme or category. For example, the user may create a travel sub-wallet that includes a travel credit card held by the user, the user's passport, and boarding passes for upcoming flights. Alternatively, the mobile wallet computing system suggests one or more sub-wallet configurations to the user based on, for example, the items stored in the user's master wallet.

The user further creates, or the mobile wallet computing system automatically determines, rules that determine when to populate the mobile wallet on the user's mobile device with a given sub-wallet. Referring to the previous example, the user may set a rule for the travel sub-wallet specifying that the mobile wallet computing system should provision the travel sub-wallet to the mobile wallet on the user's mobile device when the user is within a certain distance from an airport. Accordingly, when the mobile wallet computing system determines that the user is within the specified distance from an airport, the mobile wallet computing system populates the user's mobile wallet with information relating to the user's travel credit card, passport, and boarding passes. The user is then able to make payments with the populated information (e.g., if the populated information includes one or more payment vehicles, such as a credit card, a debit card, or a gift card) and/or show or otherwise provide the populated information to a third party.

The system described herein for providing an adaptable mobile wallet with sub-wallets offers a number of technical advantages over current systems and methods for mobile wallets. In a traditional "empty wallet" concept, the mobile wallet functions through Host Card Emulation ("HCE"). With HCE, the data relating to payment vehicles is stored in cloud servers, and the cloud servers provision payment tokens representing the user's payment vehicles to the mobile wallet of the mobile device. The rest, or most of the rest, of the data relating to the payment vehicles is stored in the cloud servers. However, while HCE mobile wallets provide a relatively secure data storage solution, HCE mobile wallets are fairly limited in terms of functionality (i.e., simply enabling payments at point-of-sale devices). Another traditional mobile wallet implementation is through a secure element framework. In a secure element framework, the user's mobile device includes a secure element that is separate from the main system memory of the user mobile device, and mobile wallet data may accordingly be stored in the secure element. But while a secure element framework may provide a more versatile mobile wallet functionality, a secure element framework may also be less secure than an HCE framework because mobile wallet data is stored locally on the mobile device.

Thus, one technical advantage of the system for providing an adaptable mobile wallet with sub-wallets described herein over current systems and methods is that the system described herein implements a hybrid mobile wallet structure. As discussed above, with this hybrid mobile wallet structure most of the user's mobile wallet data (e.g., information about payment cards, reward cards, loyalty cards, identification cards, etc.) is stored remotely, but a subset of the user's mobile wallet data may be provisioned to the user's mobile device. Because the mobile wallet is predominantly empty, there is less of a risk of sensitive information about the user (e.g., payment information, identification information, etc.) being exposed, for example, if the user's mobile device is stolen. However, because the mobile wallet is populated with mobile wallet data when certain rules are fulfilled, the user is still able to use the mobile wallet to make payments, to show loyalty cards, to store passes or identification cards until they are needed, and so on, using the mobile wallet on the mobile device. As such, the system described herein addresses both the functionality issues of HCE systems and the security issues of secure element systems.

Additionally, current systems and methods for mobile wallets often require a user to manually select the items that the user has registered to the mobile wallet when the user wishes to use them. This process of manual selection can be time-consuming and inconvenient to a user who needs the registered item(s) immediately. Furthermore, current systems and methods for mobile wallet may limit the types of items the user may register to the mobile wallet (e.g., limit the user to registering payment cards and tickets) and limit how the user may group items together within the mobile wallet. Thus, another technical advantage of the system described herein over current systems and methods is that the system described herein automatically provisions a group of items that the user has registered, with the user's master wallet, to the user's mobile device as a sub-wallet. Moreover, the sub-wallet is automatically provisioned to the user's mobile device based on rules that relate to the user's context, such as where user is, what the user is doing, the time of day or time of week, and so on. As such, the user does not need to always manually select the items that the user wishes to use, as the user's mobile wallet is provisioned with the items relevant to the user's context and situation. Thus, these functionalities of the systems and methods described herein may speed up transactions that the user carries out using the mobile wallet. Each sub-wallet may also contain a number of different types of items, such as payment cards, loyalty cards, tickets, passes, and reservations, grouped together by a theme. Accordingly, through the provisioned sub-wallet, the user may have immediate access to a group of related items that are relevant to the user's current situation.

Referring now to FIG. 1, a system 100 for providing an adaptable mobile wallet with sub-wallets is shown, according to an example embodiment. The system 100 includes a user mobile device 102, a mobile wallet computing system 104, a financial institution computing system 106, and a token service provider computing system 108 connected by a secure network (e.g., network 110). In operation, a user may register, via the user mobile device 102, a mobile wallet account with the mobile wallet computing system 104. Once the user has a mobile wallet account, the user may use the user mobile device 102 to register various items (e.g., payment vehicles, identification cards, tickets, passes, loyalty cards, rewards cards, etc.) to a master wallet held by the user as part of the user's mobile wallet account and operated by the mobile wallet computing system 104. The user may further create, via the user mobile device 102, one or more sub-wallets with the mobile wallet computing system 104 as part of the user's mobile wallet account, and the user may include items that the user has registered to the master wallet in the one or more sub-wallets. The user may also set up rules or conditions for each of the sub-wallets that govern when a given sub-wallet is provisioned to the user's mobile wallet on the user mobile device 102.

The mobile wallet computing system 104 may then tokenize the items stored in the user's master wallet (e.g., generate a number or alphanumeric character representing each of the items) and/or tokenize the one or more sub-wallets created by the user (e.g., generate a number or alphanumeric character representing the sub-wallet as a whole) through the token service provider computing system 108. For example, the token service provider computing system 108 may generate a token for each of the items stored in the user's master wallet by inputting a number associated with a given item in an algorithm. The output of the algorithm is stored in the mobile wallet computing system 104 and/or the token service provider computing system 108 as the token for the given item. As another example, the token service provider computing system 108 may generate and assign a random number or string of alphanumeric characters to each of the user's sub-wallets. The random numbers or strings of alphanumeric characters are then stored in the mobile wallet computing system 104 and/or the token service provider computing system 108 as tokens for the sub-wallets. Subsequently, once the rules or conditions associated with a given sub-wallet are fulfilled, the mobile wallet computing system 104 automatically populates a mobile wallet on the user mobile device 102 with the tokenized items in the given sub-wallet and/or with the token representing the given sub-wallet.

The user mobile device 102 includes any type of mobile device operated by a user in connection with services provided by a financial institution. As such, the user mobile device 102 includes, but is not limited to, a phone (e.g., a smartphone), a computing device (e.g., a tablet computer, a laptop computer, a personal digital assistant, etc.), a wearable device (e.g., a smart watch, smart glasses, a smart bracelet, etc.), and so on.

As shown in FIG. 1, the user mobile device 102 may include a network interface 120, an input/output circuit 122, a display 124, and a mobile wallet application 126. The network interface 120 is used to establish connections via the network 110 between the user mobile device 102 and the mobile wallet computing system 104, the financial institution computing system 106, and/or the token service provider computing system 108. The network interface 120 includes program logic that facilitates connection of the user mobile device 102 to the network 110. Accordingly, the network interface 120 supports communication between the user mobile device 102 and other components of the system 100 via the network 110, such as between the user mobile device 102 and the mobile wallet computing system 104, the financial institution computing system 106, and/or the token service provider computing system 108.

The input/output circuit 122 is structured to receive communications from and provide communications to a user of the user mobile device 102. In this regard, the input/output circuit 122 is structured to exchange data, communications, instructions, etc. with an input/output component of the user mobile device 102. Accordingly, in one embodiment, the input/output circuit 122 may include an input/output device, such as a touchscreen, a keyboard, a microphone, or a speaker. In another embodiment, the input/output circuit 122 may include communication circuitry for facilitating the exchange of data, values, messages, and the like between an input/output device and the components of the user mobile device 102. In yet another embodiment, the input/output circuit 122 may include machine-readable media for facilitating the exchange of information between the input/output device and the components of the user mobile device 102. In still another embodiment, the input/output circuit 122 may include any combination of hardware components (e.g., a touchscreen), communication circuitry, and machine-readable media.

In various embodiments, the display 124 may be a screen, a touchscreen, and the like. The user mobile device 102 may use the display 124 to communicate information to the user (e.g., by displaying the information to the user on the display 124) and/or to receive communications from the user (e.g., through a keyboard provided on a touchscreen of the display 124). In some embodiments, the display 124 may be a component of an input/output device, as described above.

The mobile wallet application 126 is configured to interface with the mobile wallet computing system 104 to allow a user to manage the user's mobile wallet account, including the user's master wallet and the user's sub-wallet(s). For example, the mobile wallet application 126 may facilitate the user in registering items to the user's master wallet and registering one or more sub-wallets. The mobile wallet application 126 is also configured to receive one or more sub-wallets from the mobile wallet computing system 104, as described in further detail below. Additionally, once populated with a sub-wallet, the mobile wallet application 126 is further configured to facilitate and permit payments by interfacing with accounts held by the user at various financial institutions (e.g., the financial institution associated with the financial institution computing system 106 and/or another financial institution). Accordingly, in various arrangements, the mobile wallet application 126 is communicably coupled via the network interface 120 to the mobile wallet computing system 104, the financial institution computing system 106, and/or the token service provider computing system 108.

In some embodiments, the mobile wallet application 126 includes a circuit embodied within the user mobile device 102. For example, the mobile wallet application 126 may include program logic stored in a system memory of the user mobile device 102. In such arrangements, the program logic may configure a processor of the user mobile device 102 to perform at least some of the functions discussed below with respect to a mobile wallet system 138 of the mobile wallet computing system 104. In some embodiments, the mobile wallet application 126 is a web-based application, and many of the functionalities are provided by the mobile wallet system 138 of the mobile wallet computing system 104. Additionally, as will be understood, the level of functionality that resides on the user mobile device 102 versus the mobile wallet computing system 104 will vary depending on the implementation.

It should also be understood, however, that the role the mobile wallet application 126 takes in payment transactions will depend on the implementation of the mobile wallet. As discussed above, in various arrangements, the mobile wallets described herein are a hybrid between a secure element framework and an HCE framework. In a secure element framework, the user mobile device 102 includes a secure element that is separate from the main system memory of the user mobile device 102 (e.g., any element having smart card functionalities, such as a universal subscriber identity circuit (a "SIM" card) or a secure digital card). Mobile wallet data for the user is stored in the secure element on the user mobile device 102. In an HCE framework, mobile wallet data is maintained within a cloud-based environment (e.g., a host emulation service or a mobile wallet database 140 of the mobile wallet computing system 104). The cloud-based environment then provisions tokens representing payment vehicles the user has registered with the cloud-based environment to the mobile wallet application on the user's mobile device (e.g., the mobile wallet application 126 on the user mobile device 102). The payment tokens are stored in the mobile device for a limited time until they expire, and then new payment tokens are provisioned to the mobile device.

Accordingly, the mobile wallets described herein are a hybrid between a secure element framework and an HCE framework. With the system 100, the majority of mobile wallet data is stored in remote servers, but a subset of the mobile wallet data may be provisioned locally to the user mobile device 102 (e.g., in a secure element). The amount of mobile wallet data stored on the remote servers versus stored on the user mobile device 102 may depend on the level of hybridization implemented in a given mobile wallet embodiment (e.g., the extent to which the mobile wallet is implemented through a secure element framework versus the extent to which the mobile wallet is implemented through an HCE framework), with the configuration of the sub-wallets as desired or defined to match the mobile wallet implementation. Moreover, in various other arrangements, the user-specific payment information may be stored in a trusted execution environment ("TEE") within a processor of the user mobile device 102. The systems and methods disclosed herein may also be used with other modalities currently available for storage and transfer of user payment via contactless communication mechanisms.

In various arrangements, the mobile wallet application 126 is structured to enable the user to manage the mobile wallet, the master wallet, and/or the one or more sub-wallets. In this regard, the mobile wallet application 126 is structured to present, control, and otherwise manage displays or graphical user interfaces on the user mobile device 102 including information related to various payment vehicles. For example, the mobile wallet application 126 may present the user with displays enabling the user to input information pertaining to various payment vehicles. The screens may enable the user to manually input information (e.g., a primary account number ("PAN") for a payment vehicle) pertaining to a payment vehicle or enable the user to take a picture of a payment vehicle. The mobile wallet application 126 may then process the information input by the user, identify account information, and transmit the information to the mobile wallet computing system 104 for storage (e.g., in the mobile wallet database 140 in association with the user).

Additionally, the mobile wallet application 126 may present the user with displays enabling the user to register non-payment items, such as loyalty or rewards cards, passes, reservations, tickets, identification cards, coupons, and so on, with the mobile wallet computing system 104. For example, to register a physical item such as a loyalty card, a coupon, a driver's license, or a passport, the mobile wallet application 126 may allow the user to manually input information relating to the item to be registered (e.g., a barcode number, a driver's license number) and/or take a picture of the item. The mobile wallet application 126 may then process the input information relating to the item to be registered and transmit the information to the mobile wallet computing system 104 for storage.

In some embodiments, the mobile wallet application 126 may also register items to the mobile wallet computing system 104 without requiring input by the user. As an example, the mobile wallet application 126 may interface with an application running on the user mobile device 102 (e.g., a text messaging application, an email application, a ticket application, a hotel application, etc.) and extract information from the application relating to an item to be registered, such as a ticket, a pass, a reservation, or a coupon. The mobile wallet application 126 may process the extracted information relating to the item to be registered and transmit the information to the mobile wallet computing system 104 for storage. As another example, the mobile wallet application 126 may monitor one or more online accounts associated with the user that the user has given the mobile wallet application 126 permission to access, such as an email account, ticketing account, or e-commerce account whereby the user may purchase vouchers for activities (e.g., Groupon®, LivingSocial®). The mobile wallet application 126 may extract information relating to an item to be registered (e.g., a movie ticket, a concert ticket, a theatre ticket, a boarding pass, a train ticket, a voucher, a coupon, etc.) and automatically transmit the extracted information to the mobile wallet computing system 104.

Furthermore, in various embodiments, the mobile wallet application 126 is structured to permit the user to engage in mobile wallet transactions. As used herein, the term "mobile wallet transaction" is meant to be broadly interpreted to refer to transactions accomplished via the mobile wallet on the user mobile device 102. As such, a mobile wallet transaction may include, but is not limited to, a person-to-person payment, a payment for a good or service at a point-of-sale terminal of a merchant, and the like. A mobile wallet transaction may also include a non-payment transaction, such as transmitting ticket information to a third party device. In some arrangements, the mobile wallet application 126 engages in mobile wallet transactions through the initiation of communications with, for example, a merchant point-of-sale device. In this regard, the user mobile device 102 may include a near field communication ("NFC") chip and an associated controller that configures the chip to exchange information with the merchant point-of-sale device (e.g., an NFC reader). The mobile wallet application 126 may thus transmit payment information to the merchant point-of-sale device using the NFC chip and associated controller. In other arrangements, the mobile wallet application 126 engages in mobile wallet transactions through the display 124. For example, the user mobile device 102 may display a Quick Response Code ("QR code") for a ticket on the display 124 such that a third party can scan the QR code.

The mobile wallet application 126 is also configured to present displays that enable the user to perform actions with digital items. As used herein, "digital items" is meant to broadly encompass items that the user has registered in the user's master wallet (e.g., via the mobile wallet application 126). Digital items may include, for example, payment vehicles, digital representations of physical items (e.g., digital representations of rewards cards, loyalty cards, identification cards, membership cards, wholesale club cards, and the like), and e-items (e.g., e-tickets, boarding passes, coupons, and the like). In various embodiments, the mobile wallet application 126 presents displays enabling the user to select a payment vehicle (e.g., from the payment vehicles whose information is currently provisioned to the user mobile device 102) for a transaction payment. Moreover, in some embodiments, the mobile wallet application 126 may enable the user to perform various other actions using a selected payment vehicle (e.g., use the selected vehicle to complete a mobile wallet transaction, manage an account at a financial institution associated with the selected payment vehicle, view a transaction history associated with the payment vehicle, and the like). Similarly, the mobile wallet application may present the user with displays that enable the user to select a registered non-payment item (e.g., from the items whose information is currently provisioned to the user mobile device 102) and perform various actions using the selected item (e.g., show a digital representation of the item to a third party, show a barcode of the item to a third party, and the like).

The mobile wallet computing system 104 is structured to permit, enable, facilitate, manage, process, and otherwise allow mobile wallet transactions. In this regard, the mobile wallet computing system 104 may store information relating to various digital items, including the payment information for registered payment vehicles, digital representations of physical items, and e-items. The mobile wallet computing system 104 may be associated with, owned by, and/or otherwise operated by a mobile wallet provider. In one embodiment, the mobile wallet provider may be a financial institution, such as the financial institution associated with the financial institution computing system 106. In that case, the mobile wallet computing system 104 may be part of the financial institution computing system 106. In another embodiment and as shown in FIG. 1, the mobile wallet provider may be a third-party provider relative to the financial institution that operates the financial institution computing system 106. As will be appreciated, the level of functionality that resides on the financial institution computing system 106 as opposed to the mobile wallet computing system 104 may vary depending on the implementation.

As shown in FIG. 1, the mobile wallet computing system 104 includes a network interface 130, a processing circuit 132, and a mobile wallet system 138. The network interface 130 includes program logic that facilitates connection of the mobile wallet computing system 104 to the network 110. Accordingly, the network interface 130 supports communication between the mobile wallet computing system 104 and other components of the system 100 via the network 110, such as between the mobile wallet computing system 104 and the user mobile device 102, the financial institution computing system 106, and/or the token service provider computing system 108.

The processing circuit 132 includes a processor 134 and a memory 136. As shown in FIG. 1, the memory 136 includes a mobile wallet database 140. The mobile wallet database 140 is structured to retrievably store information regarding mobile wallet accounts held by various users, such as for a mobile wallet account held by the user of the user mobile device 102. For instance, the mobile wallet database 140 may store information related to the user and/or the user mobile device 102, such as authentication information (e.g., username/password combinations, device authentication tokens, security question answers, etc.), upon registration of one or both for a mobile wallet. The mobile wallet database 140 may further store, in association with the user's mobile wallet account, the user's master wallet and one or more sub-wallets. The mobile wallet database 140 may store within the user's master wallet all or mostly all of the items that the user has registered with the mobile wallet computing system 104, including payment cards, loyalty cards, rewards cards, identification cards, passes, tickets, reservations, coupons, and so on. Similarly, the mobile wallet database 140 may store in each sub-wallet a subset of the items stored in the master wallet. Furthermore, the mobile wallet database 140 may store any other information that may be encountered in the operation of a mobile wallet account or otherwise referenced herein, such as user preferences and other information comprising a user profile. In various embodiments, the mobile wallet database 140 is structured as one or more remote data-storage facilities (e.g., cloud servers).

In some arrangements, the mobile wallet database 140 also includes a token vault that is maintained by the mobile wallet computing system 104. The token vault may include a lookup table maintaining tokens associated with various user payment vehicles and/or with various sub-wallets. The tokens stored therein may be generated internally (e.g., at the mobile wallet computing system 104) or by other entities (e.g., the token service provider computing system 108). For example, in one embodiment, the token vault may include a lookup table including tokens that have been generated and assigned to digital items such as user payment vehicles (e.g., user lines of credit, user checking accounts, and the like) and/or to user sub-wallets. In some arrangements, the mobile wallet computing system 104 may include an associated token management system (not shown) including one or more algorithms, processes, formulas, and so on that facilitate the efficient searching of the information stored in the token vault. For example, if the token is for a payment vehicle, a mapping algorithm may be utilized to map Token-to-PAN information. Thus, when a token is received, the mapping algorithm determines the associated PAN and transmits that information to the inquiring computing system. Alternatively, in other arrangements, the token vault is provided at a computing system associated with a separate entity, such as the token service provider computing system 108 as described below. Additionally, the token generation process is described in further detail below with respect to the token service provider computing system 108.

The mobile wallet system 138 is structured to provide mobile wallet services for the user, including providing a mobile wallet on the user mobile device 102 and allowing the user to configure a master wallet and one or more sub-wallets. In some embodiments, the mobile wallet system 138 is structured to provide a mobile wallet client application (e.g., the mobile wallet application 126 discussed above) on the user mobile device 102. In this regard, the mobile wallet system 138 enables registration of a user for a mobile wallet account, presents the user with various user interfaces enabling the user to use or manage the mobile wallet (e.g., register items to the master wallet, configure one or more sub-wallets), and enables the user to perform transactions using the mobile wallet. A more detailed view of the mobile wallet system 138 is described below in relation to FIG. 2.

The financial institution computing system 106 is a computing system owned or otherwise operated by a financial institution that provides and maintains one or more financial accounts (e.g., a demand deposit account, credit or debit card account, brokerage account, etc.) on behalf of the user. In some arrangements, the financial institution is an issuer of a payment vehicle (e.g., a credit card, a debit card) held by the user. In the context of the present disclosure, the financial institution can include commercial or private banks, credit unions, investment brokerages, mobile wallet providers, and so on, but can also include any commercial entity capable of maintaining payment vehicles on behalf of a user, including retailers, vendors, service providers, and the like. In some arrangements, the financial institution is also a mobile wallet provider configured to manage mobile wallet accounts on behalf of its customers (i.e., users). For example, the financial institution computing system 106 may include the mobile wallet computing system 104 in various embodiments.

As shown in FIG. 1, the financial institution computing system 106 includes a network interface 150, a processing circuit 152, an accounts management circuit 158, and an identity verification circuit 160. The network interface 150 includes program logic that facilitates connection of the financial institution computing system 106 to the network 110. Accordingly, the network interface 150 supports communication between the financial institution computing system 106 and other components of the system 100 via the network 110, such as between the financial institution computing system 106 and the user mobile device 102, the mobile wallet computing system 104, and/or the token service provider computing system 108.

The processing circuit 152 includes a processor 154 and a memory 156. In some arrangements, the financial institution computing system 106 may further include an integration circuit that may, for example, include an API that facilitates the delivery of account information (e.g., account balance information, an account transaction history, and the like) to the user mobile device 102. As shown in FIG. 1, the memory 156 includes a customer accounts database 162. The customer accounts database 162 is structured to retrievably store user information relating to the various operations discussed herein. For example, the customer accounts database 162 may include personal information (e.g., names, addresses, phone numbers, and so on), authentication information (e.g., username/password combinations, device authentication tokens, security question answers, unique customer identifiers, biometric data, etc.), and financial information (e.g., token information, account numbers, account balances, available credit, credit history, transaction histories, and so on) relating to the various users and associated financial accounts.

The accounts management circuit 158 is structured to manage the financial accounts of various users, including maintaining and handling transaction processing for the user's one or more financial accounts. Accordingly, the accounts management circuit 158 is configured to process payments made from an account of the user held at the financial institution associated with the financial institution computing system 106. In some embodiments, the accounts management circuit 158 is further configured to interface with the mobile wallet application 126 on the user mobile device 102 such that the accounts management circuit 158 provides interfaces, displays, and associated content to enable users to manage accounts at the financial institution associated with the financial institution computing system 106 via the mobile wallet application 126.

The identity verification circuit 160 is structured to verify information received from a user in the mobile wallet account registration process and/or in the process of registering a payment vehicle the user holds through the financial institution to the mobile wallet computing system 104, as described above. Accordingly, the identity verification circuit 160 obtains information from various sources (e.g., by sending a text to the user mobile device 102 with a verification code) to authenticate a new user.

The token service provider computing system 108 includes a computing system configured to provision payment credentials (e.g., payment tokens) on behalf of a mobile wallet user. The token service provider computing system 108 may be operated by a credit card network or other type of payment system, an acquiring or issuing financial institution (e.g., financial institution computing system 106), a merchant, a mobile wallet provider (e.g., mobile wallet computing system 104), and/or another provider. Accordingly, the token service provider computing system 108 may be a separate computing system, as shown in FIG. 1, or the token service provider computing system may be part of the mobile wallet computing system 104 and/or the financial institution computing system 106.

As shown, the token service provider computing system 108 includes a network interface 170, a processing circuit 172, and a token generator 178. The network interface 170 includes program logic that facilitates connection of the token service provider computing system 108 to the network 110. Accordingly, the network interface 170 supports communication between the token service provider computing system 108 and other components of the system 100, such as between the token service provider computing system 108 and the user mobile device 102, the mobile wallet computing system 104, and/or the financial institution computing system 106.

The processing circuit 172 includes a processor 174 and a memory 176. As shown in FIG. 1, the memory 176 includes a token database 182. The token database 182 is structured to retrievably store tokens generated and provisioned by the token service provider computing system 108, as described herein. In various embodiments, the token database 182 may include a token vault with a lookup table maintaining tokens associated with various digital items registered by the user (e.g., registered payment vehicles) and/or with various sub-wallets. In various embodiments, the token vault is configured similarly to the token vault that may be included in the mobile wallet database 140 of the mobile wallet computing system 104 discussed above.

The token generator 178 is configured to facilitate various services associated with payment tokens, including generating and provisioning new tokens, authorizing a token for use in a financial transaction, storing payment vehicle tokens (e.g., in the token database 182), and managing the life cycles of the payment vehicle tokens. For example, the token generator 178 and the sub-wallet token generator 180 may manage expiration times for various tokens, after which they are no longer valid, and download new tokens to the user mobile device 102 to replace expired tokens. Additionally, the token generator 178 and the sub-wallet token generator 180 may be configured to provision tokens in response to a request received from the mobile wallet computing system 104.

More specifically, the token generator 178 is configured to generate and provision tokens for digital items stored in the mobile wallet database 140 using tokenization processes. For example, the mobile wallet computing system 104 may request from the token service provider computing system 108 tokens for items registered by the user and stored to the mobile wallet database 140. In response, the token generator 178 may create a token by generating a random number, by generating a random string of alphanumeric characters, by inputting a number associated with each item into a tokenization algorithm, and the like for each requested item, The token generator 178 may then store each token, as well as the token's association with the corresponding item, in the token database 182. Alternatively, or additionally, the token generator 178 may provide the token to the mobile wallet computing system 104, which may store the token in a token vault maintained internally within the mobile wallet computing system 104 (e.g., within the mobile wallet database 140).

The sub-wallet token generator 180 is configured to generate and provision a token for a sub-wallet that has been created by the user and stored in the mobile wallet database 140. In response to a token request for a sub-wallet from the mobile wallet computing system 104, the sub-wallet token generator 180 may create a token (e.g., a random number, a random set of alphanumeric characters, the output of a tokenization algorithm) for the sub-wallet. The sub-wallet token generator 180 may further store the token, as well as the token's association with the corresponding sub-wallet, in the token database 182 and/or provide the token to the mobile wallet computing system 104 to be stored in the mobile wallet database 140.

Figure 2:
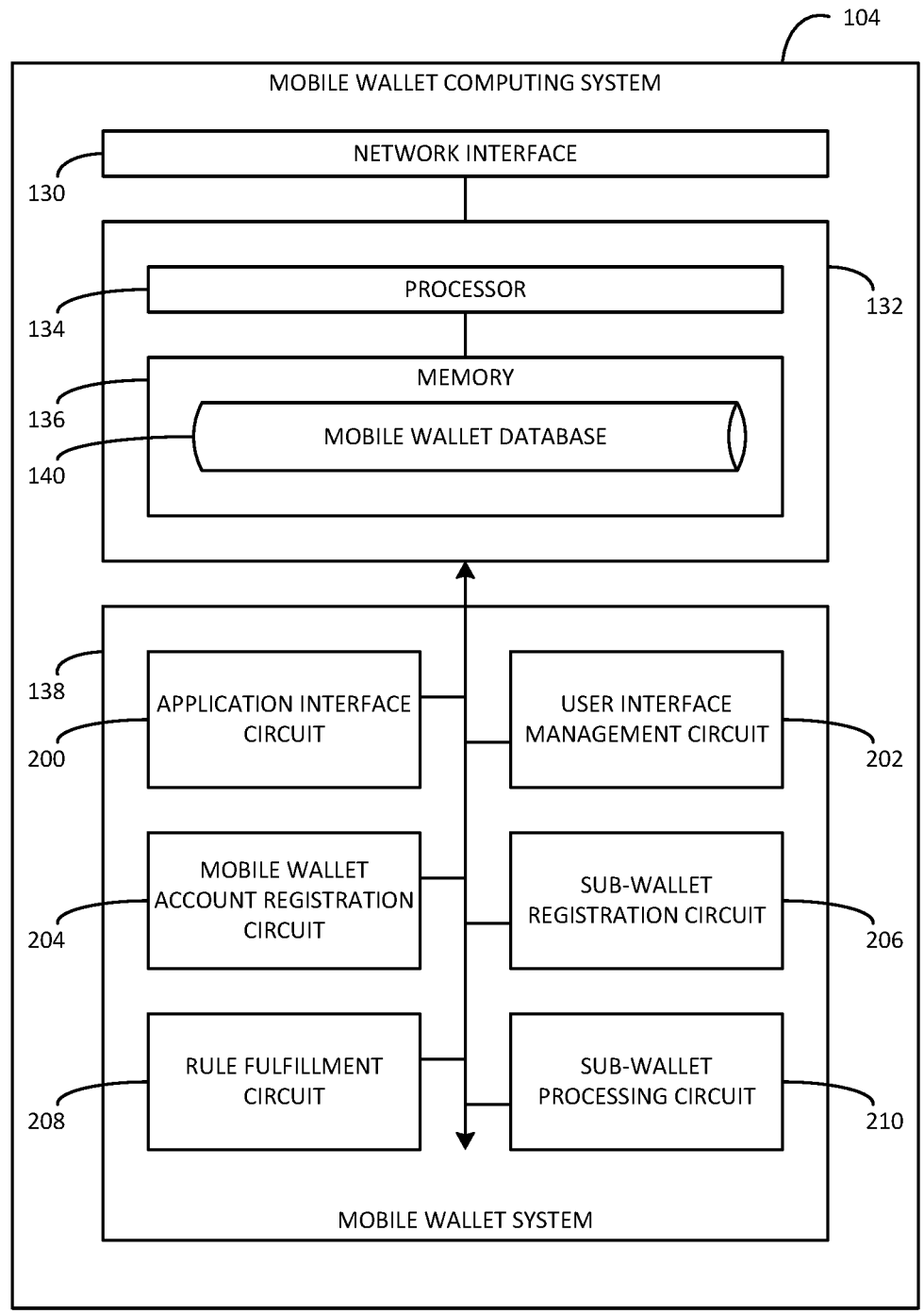
FIG. 2 is a detailed schematic diagram of a financial institution computing system of FIG. 1, according to an example embodiment.

Referring now to FIG. 2, a more detailed view of the mobile wallet computing system 104 of the system 100 in FIG. 1 is illustrated. As shown in FIG. 2, the mobile wallet system 138 of the mobile wallet computing system 104 further includes an application interface circuit 200, a user interface management circuit 202, a mobile wallet account registration circuit 204, a sub-wallet registration circuit 206, a rule fulfillment circuit 208, and a sub-wallet processing circuit 210. As shown, each of these circuits may be communicably and operatively coupled to each other and to the mobile wallet database 140. However, other embodiments of the mobile wallet system 138 may include more or fewer circuits without departing from the spirit and scope of the present disclosure. Further, some embodiments of the mobile wallet system 138 may combine the activities of one circuit with another circuit to form a single circuit. Therefore, those of ordinary skill in the art will appreciate that the present arrangement is not meant to be limiting.

The application interface circuit 200 may be program logic that configures the mobile wallet system 138 to integrate payment-related functionalities and digital item registration into a user's mobile wallet. In some arrangements, the application interface circuit 200 includes a series of software elements that provide accessibility to various functionalities discussed herein. In this regard, the application interface circuit 200 may include a plurality of sets of program logic associated with various functionalities developed by the mobile wallet provider associated with the mobile wallet computing system 104 and/or the financial institution associated with the financial institution computing system 106. Such functionalities may enable the user to register various items to the mobile wallet and/or perform various operations with respect to registered user payment vehicles (e.g., manage an account maintained by the financial institution computing system 106, view an account balance, view a transaction history, and the like).

The user interface management circuit 202 is structured or configured to generate, update, control, or otherwise manage displays/graphical user interfaces of the mobile wallet. In various arrangements, the user interface management circuit 202 updates the user interfaces responsive to user interactions with various portions of a mobile wallet interface presented to a user. In some arrangements, the user interface management circuit 202 further updates the user interfaces viewable by the user responsive to information received from the mobile wallet computing system 104 and/or financial institution computing system 106. For example, responsive to receiving updated account balance information from the financial institution computing system 106, the user interface management circuit 202 may update user interface parameters associated with the mobile wallet application 126 to incorporate the balance information.

The mobile wallet account registration circuit 204 may perform a registration process whereby a mobile wallet account for the user is created. In this regard, the mobile wallet account registration circuit 204 may present the user with a plurality of registration interfaces (e.g., viewable by a web browser on the user mobile device 102) prompting the first-time user to input information such as payment vehicle information, user identifying information, login credentials, and the like. The registration interfaces may also ask the user permission to access, for example, user social media data, user accounts, and other data.

Additionally, once the user has been provided with a mobile wallet account, the mobile wallet account registration circuit 204 may allow a user to register various items to the user's master wallet. In various embodiments, the mobile wallet account registration circuit 204 may interface with the mobile wallet application 126 on the user mobile device 102 to facilitate the registration of payment vehicles, passes, rewards or loyalty cards, identification cards, coupons, and so on, to the user's master wallet. For example, the mobile wallet account registration circuit 204 may interface with the mobile wallet application 126 to receive manually input information relating to an item to be registered (e.g., to receive an inputted PAN, barcode, driver's license number, and so on), or to receive an image of the item to be registered taken by a camera of the user mobile device 102. Furthermore, in some embodiments, the mobile wallet account registration circuit 204 may interface with various user accounts that the user has given the mobile wallet account registration circuit 204 permission to access, such as an email account, ticketing account, or e-commerce account. The mobile wallet account registration circuit 204 may extract information relating to an item to be registered from the user's monitored account(s) and automatically register the item to the user's master wallet.

Once the user has registered for a mobile wallet account and included items in the master wallet, the sub-wallet registration circuit 206 is configured to facilitate a user in setting up one or more sub-wallets. In one embodiment, the sub-wallet registration circuit 206 may communicate with the user interface management circuit 202 to provide user interfaces with buttons, menus, and the like whereby the user may create a sub-wallet and include one or more items registered to the master wallet in the sub-wallet. In another embodiment, the sub-wallet registration circuit 206 may analyze the items that the user has included in the master wallet and suggest one or more sub-wallet configurations for the user. For example, if the user has provisioned a travel rewards card, a credit card with no foreign transaction fees, and boarding passes to the master wallet, the sub-wallet registration circuit 206 may suggest that the user create a travel sub-wallet with these items included therein.

Additionally, the sub-wallet registration circuit 206 is configured to facilitate the user in setting up rules for each of the user's registered sub-wallets. As discussed above, in various embodiments, the sub-wallets for the users of system 100 are stored in remote data storage facilities (e.g., cloud servers). Accordingly, rules may be set up for each sub-wallet to instruct the mobile wallet computing system 104 when to provision each sub-wallet to the mobile wallet on the user mobile device 102. For example, when conditions associated with certain rules are fulfilled for a given sub-wallet, the sub-wallet is provisioned to the mobile wallet on the user mobile device 102. Rules may be based on, for example, the time of day, week, month, or year (e.g., the sub-wallet is provisioned to the user mobile device 102 on weekends); the location of the user (e.g., the sub-wallet is provisioned to the user mobile device 102 when the user is within a certain distance of a retail store, as determined by the global positioning system (GPS) of the user mobile device 102); items on the user's calendar (e.g., the sub-wallet is provisioned to the user mobile device 102 when the user's calendar shows that the user is supposed to be traveling); information extracted from items in the user's master wallet (e.g., the sub-wallet is provisioned to the user mobile device 102 once the current time is within two hours of a departure time on a boarding pass in the sub-wallet); the user's context (e.g., the sub-wallet is provisioned to the user mobile device 102 when a camera on the user mobile device 102 shows that the user is traveling with children); the user's contacts (e.g., the sub-wallet is provisioned to the user mobile device 102 when the user is accompanied by one of the user's contacts); and so on.

In one embodiment, the user may provide rules to the sub-wallet registration circuit 206, via the user mobile device 102. For example, the user may provide rules for the sub-wallet that align with the user's preferences for the sub-wallet. In another embodiment, the user may select rules for each sub-wallet from a list of potential rules provided by the sub-wallet registration circuit 206. In yet another embodiment, the sub-wallet registration circuit 206 may recommend rules to the user based on, for example, a classification of the sub-wallet (e.g., personal, business, travel, entertainment, etc.), the items provisioned in the sub-wallet, and so on. The user may then accept some or all of the recommended rules. In each of these embodiments, the user and/or the sub-wallet registration circuit 206 may specify which rules or how many rules need to be fulfilled before the sub-wallet is provisioned to the user mobile device 102. Additionally, in various embodiments, the user and/or the sub-wallet registration circuit 206 may specify a "default" sub-wallet, or a sub-wallet that is provisioned to the user mobile device 102 in the absence of another sub-wallet being provisioned to the user mobile device 102.

Moreover, in some arrangements, rather than instructing the mobile wallet computing system 104 to make a payment from a particular payment vehicle, the user may provide the mobile wallet computing system 104 with a sub-wallet that the user would like a payment to be made from. Accordingly, in this situation, the mobile wallet computing system 104 must be able to determine which payment vehicle included in the designated sub-wallet should be used to cover the payment. Accordingly, the user may specify through the sub-wallet registration circuit 206, or the sub-wallet registration circuit 206 may suggest, one or more rules that guide the mobile wallet computing system 104 in determining which payment vehicle to use from a given sub-wallet for various transaction payments. For example, rules may specify that a payment should be made from a given payment vehicle based on what the payment is for, who or what the payment is being made to, where the user is, and so on.

Furthermore, in some arrangements, the user may further specify through the sub-wallet registration circuit 206, or the sub-wallet registration circuit 206 may suggest, one or more "removal" rules that determine when the sub-wallet is removed from the user mobile device. For example, a rule for a sub-wallet may specify that the sub-wallet expires and is removed from the user mobile device 102 after three hours. As another example, a rule for a sub-wallet may specify that the sub-wallet should be provisioned to the user mobile device 102 when the user is within a certain distance of a landmark (e.g., a wholesale club, a train station, an airport, the user's place of employment, etc.) and that the sub-wallet should further be removed from the user mobile device 102 when the user is outside of that distance.

The rule fulfillment circuit 208 is configured to continuously monitor the context of the user (e.g., monitor the user mobile device 102, monitor the environment of the user) to determine whether the rules for each sub-wallet are fulfilled. In one embodiment, the rule fulfillment circuit 208 may communicate with the application interface circuit 200 to monitor the user mobile device 102 and use one or more functionalities included in the user mobile device 102 to determine whether rules are fulfilled. For example, the rule fulfillment circuit 208 may determine whether the user is within a certain distance of a location by using GPS functionalities of the user mobile device 102, using information about a Wi-Fi network the user mobile device 102 is connected to, and so on. In another embodiment, the rule fulfillment circuit 208 may determine whether rules are fulfilled using internal functionalities of the mobile wallet computing system 104. For example, the mobile wallet computing system 104 may include an internal clock, and the rule fulfillment circuit may use the internal clock to determine whether a day/week/month rule is fulfilled. In a third embodiment, the rule fulfillment circuit 208 may determine whether rules are fulfilled by interfacing with third-party functionalities, such as interfacing the an online calendar of the user, interfacing with the user's email account, and so on.

If the rule fulfillment circuit 208 determines that the requisite rules for a sub-wallet are fulfilled, the rule fulfillment circuit 208 is further structured to provision the sub-wallet to the user mobile device 102 (e.g. transmit the tokens representing individual digital items in the sub-wallet to the user mobile device 102, transmit a token representing the sub-wallet as a whole to the user mobile device 102). Once provisioned, the sub-wallet and content thereof is then accessible to the user through, for example, the mobile wallet application 126 of the user mobile device 102. Additionally, the rule fulfillment circuit 208 may further include an expiration trigger for the sub-wallet and/or remove the sub-wallet from the mobile wallet based on the fulfillment of certain rules, as discussed above.

In various embodiments, when the rule fulfillment circuit 208 provisions a sub-wallet to the mobile wallet on the user mobile device 102, the rule fulfillment circuit 208 downloads to the user mobile device 102 tokens representative of the items in the sub-wallet. In one embodiment, the mobile wallet account registration circuit 204 and/or sub-wallet registration circuit 206 may communicate, via the network interface 130, with the token service provider computing system 108 to tokenize the items in the master wallet at the time the user registers each item to the master wallet. The rule fulfillment circuit 208 may then download the tokens associated with the items included in the sub-wallet to the user mobile device 102 once the requisite rules for the sub-wallet are fulfilled. In another embodiment, once the rule fulfillment circuit 208 determines that the requisite rules for a sub-wallet are fulfilled, the rule fulfillment circuit 208 may communicate, via the network interface 130, with the token service provider computing system 108 to tokenize the items in the sub-wallet. The rule fulfillment circuit 208 may then provision the subsequently received tokens to the user mobile device 102.

Alternatively, rather than tokenizing individual items in a sub-wallet, the mobile wallet system 138 may tokenize the entire sub-wallet. Thus, in one embodiment, once the user sets up a sub-wallet, the sub-wallet registration circuit 206 may communicate, via the network interface 130, with the token service provider computing system 108 to create a token representative of the sub-wallet. In another embodiment, the rule fulfillment circuit 208 may communicate with the token service provider computing system 108 to tokenize the sub-wallet once the rule fulfillment circuit 208 determines that the sub-wallet should be downloaded to the user mobile device 102. The rule fulfillment circuit 208 may then provision the token representing the sub-wallet as a whole to the user mobile device 102. For example, a token representing a sub-wallet may be a random number or random string of alphanumeric characters assigned to the sub-wallet by the mobile wallet computing system 104 or the token service provider computing system 108. Once assigned to the sub-wallet, the random number or random string of alphanumeric characters may be stored in association with the sub-wallet in the mobile wallet database 140 and/or the token database 182 such that the sub-wallet can be identified by the random number or random string of alphanumeric characters.

In various embodiments, the sub-wallet processing circuit 210 is structured to process user payment requests using a given sub-wallet. For example, the user may indicate (e.g., via the mobile wallet application 126 provided on the user mobile device 102) a preference to engage in a mobile wallet transaction using a payment vehicle in a sub-wallet that has been provisioned to the user mobile device 102. The mobile wallet application 126 provided on the user mobile device 102 may then transmit transaction information, a token representing the payment vehicle, and any other payment information or security information (e.g., a cryptogram) to a merchant, which may then transmit the token and the aforementioned described information to the mobile wallet computing system 104. The sub-wallet processing circuit 210 may receive this information and either de-tokenize the token (e.g., identify the payment vehicle information associated with the token) or transmit the token to the token service provider computing system 108 for de-tokenization. Once the token is de-tokenized, the sub-wallet processing circuit 210 may identify the financial institution associated with the payment vehicle and transmit the transaction information to the financial institution computing system 106, which may authorize the transaction request. In response to receiving an authorization from the financial institution computing system 106, the sub-wallet processing circuit 210 may transmit an authorization to the merchant over the network 110, which may enable the user to complete the transaction.

In another example, the sub-wallet as a whole may be tokenized and provided to the user mobile device 102, as described above. Accordingly, the user may indicate that the user wishes to engage in a mobile wallet transaction using a sub-wallet provisioned to the user mobile device 102. The mobile wallet application 126 may then transmit transaction information, the sub-wallet token, and any other payment information or security information (e.g., a cryptogram) to a merchant, which may then transmit the token and the aforementioned described information to the mobile wallet computing system 104. The sub-wallet processing circuit 210 may receive this information and either de-tokenize the sub-wallet token (e.g., identify the sub-wallet associated with the token) or transmit the sub-wallet token to the token service provider computing system 108 for de-tokenization. Once the sub-wallet token is de-tokenized, the sub-wallet processing circuit 210 may determine which payment vehicle provisioned in the sub-wallet to use as a payment for the transaction. In one embodiment, the mobile wallet system 138 may only allow the user to include one payment vehicle per sub-wallet, and accordingly the sub-wallet processing circuit 210 may use the payment vehicle included in the sub-wallet. In another embodiment, the mobile wallet system 138 may allow the user to include multiple payment vehicles per sub-wallet and may determine which payment vehicle to use for a given transaction based on, for example, payment rules set up for the sub-wallet or a determination of the most appropriate payment vehicle for the purchase (e.g., a travel credit card for a bus tickets purchase).

Figure 4:
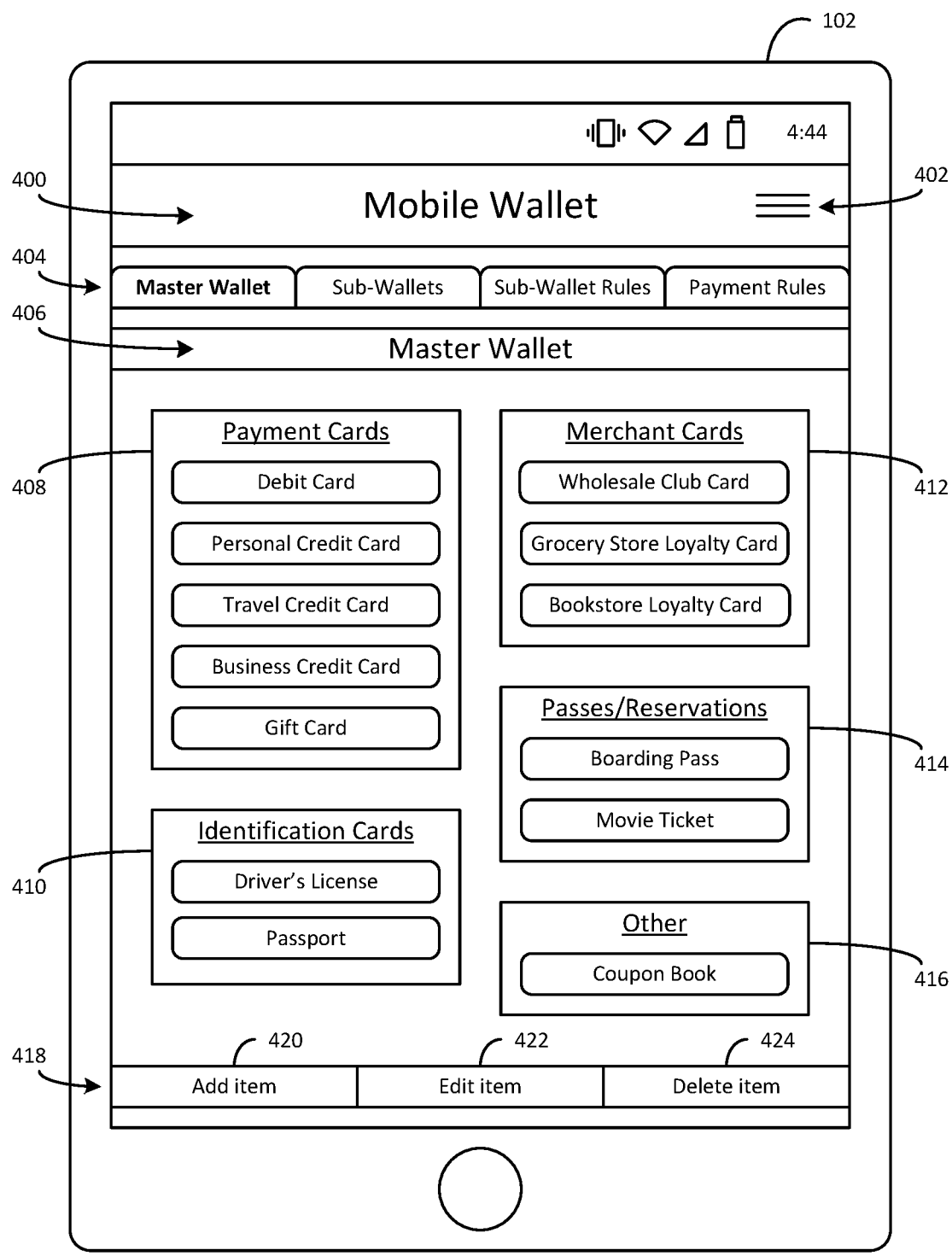
FIGS. 4-7 are graphical user interfaces shown to a user using an adaptable mobile wallet with sub-wallets, via the system of FIG. 1, according to an example embodiment.

In various embodiments, the sub-wallet processing circuit 210 may also process user requests for a payment from a payment vehicle and/or a sub-wallet not provisioned to the mobile wallet on the user mobile device 102. For example, in response to a user request, the mobile wallet application 126 may display a list of all the items provisioned to the user's master wallet, including items not currently provisioned to the mobile wallet on the user mobile device 102 (e.g., as shown in FIG. 4, discussed in further detail below). The user may then select a payment vehicle that is not provisioned to the mobile wallet from the list to use for a transaction payment, and the mobile wallet application 126 may send the selection to the mobile wallet computing system 104. The selection may be received by the sub-wallet processing circuit 210, which may provision the token associated with the selected payment vehicle to the mobile wallet on the user mobile device 102. The sub-wallet processing circuit 210 may then process a payment by the selected payment vehicle in the same manner as described above.

Additionally, the sub-wallet processing circuit 210 may be configured to process requests related to non-payment items included in a given sub-wallet. For example, a user may request, through the mobile wallet application 126, to use an identification card included in a sub-wallet provisioned to the mobile wallet of the user mobile device 102 in a tokenized form. In response, the mobile wallet application 126 may send the request to the mobile wallet computing system 104, where it is received by the sub-wallet processing circuit 210. The sub-wallet processing circuit 210 may receive this information and either de-tokenize the sub-wallet token or transmit the sub-wallet token to the token service provider computing system 108 for de-tokenization. Once the sub-wallet is detokenized, the sub-wallet processing circuit 210 may send the requested identification card to the mobile wallet of the user mobile device 102. Alternatively, the sub-wallet processing circuit 210 may send the identification card to a third party (e.g., a merchant) specified by the user.

Figure 3:
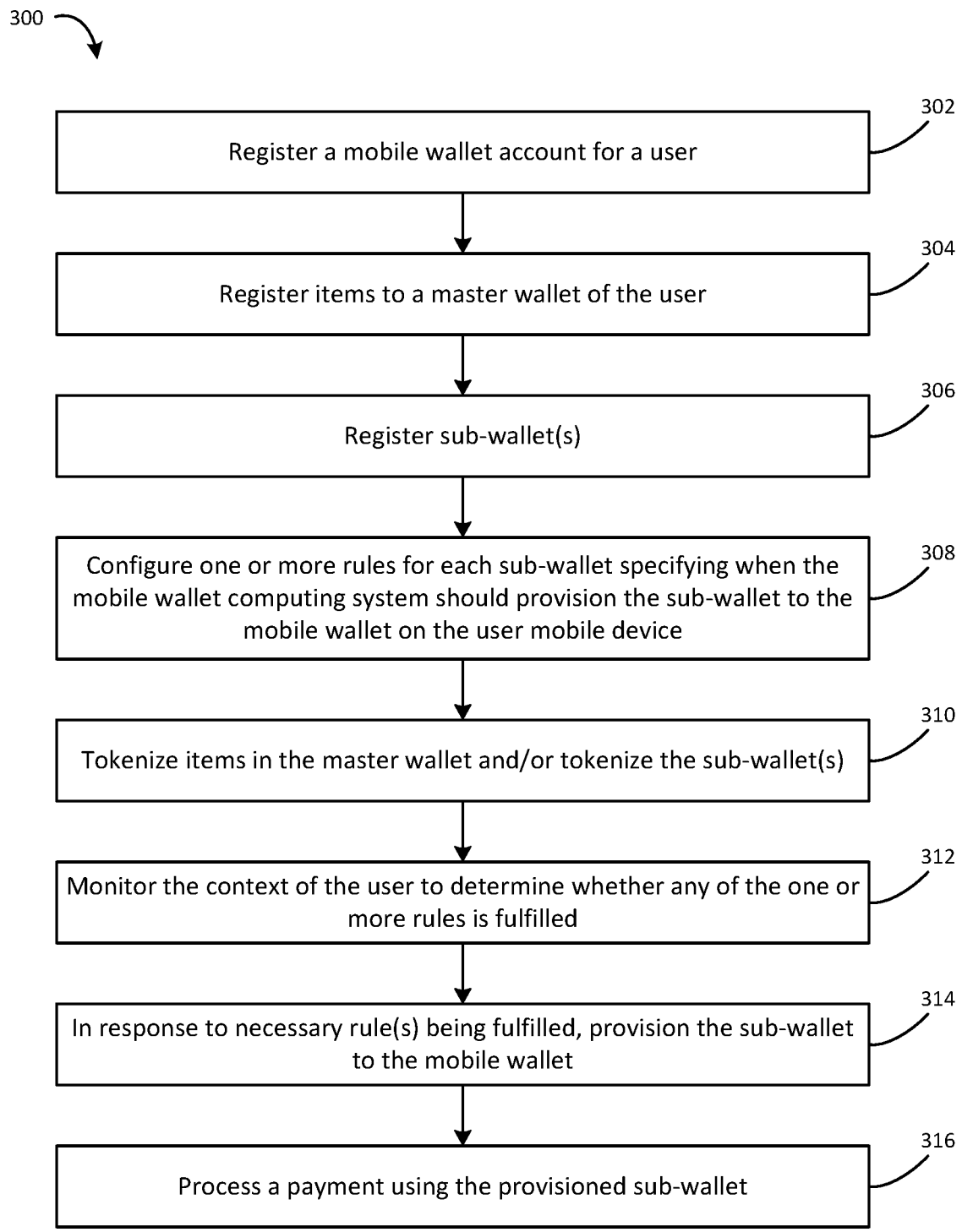
FIG. 3 is a flow diagram illustrating a process of providing an adaptable mobile wallet with sub-wallets, according to an example embodiment.

Referring now to FIG. 3 in combination with FIGS. 1-2, an example method 300 of providing a payment through system 100 is shown, according to one embodiment. In this regard, because method 300 may be implemented with the system 100 as illustrated FIGS. 1-2, reference may be made to one or more components of FIGS. 1-2 in explaining method 300.

At process 302, a mobile wallet account for a user is registered. In some arrangements, the mobile wallet computing system 104 receives a request for a mobile wallet account from the user mobile device 102. For example, the user may access a website associated with the mobile wallet provider via the user mobile device 102 and indicate a preference to register for the mobile wallet. In other arrangements, such as where the mobile wallet computing system 104 is integrated into the financial institution computing system 106, the registration request may be received from a computing system associated with the financial institution. For example, a user may enter into a brick-and-mortar location associated with a financial institution and sign up for an account with the assistance of a financial institution employee. Furthermore, at process 302, the user may be presented with one or more registration interfaces. In various arrangements, the mobile wallet system 138 transmits registration interfaces to the computing device that the registration preference was received from (e.g., the user mobile device 102 or the financial institution computing system 106) over the network 110. The registration interfaces may request various forms of information from the user. For example, a registration interface may prompt the user to establish login credentials for the mobile wallet, or input information that can be used to authenticate the user.

Once the mobile wallet computing system 104 receives the registration information, the user is authenticated. For example, in arrangements where the mobile wallet computing system 104 is associated with the financial institution computing system 106, the mobile wallet system 138 may access a database (e.g., the customer accounts database 162) to retrieve verified user authentication information and compare received authentication information with the verified authentication information. The mobile wallet system 138 may also communicate with the identity verification circuit 160 discussed above to verify the new mobile wallet user's identity. For instance, the mobile wallet system 138 may transmit scanned images of a user's driver's license to the identity verification circuit 160 for further processing and authentication.

At process 304, items are registered to a master wallet of the user. As discussed above, once a user registers for a mobile wallet account using the system 100, the user is provided with a master wallet, which is stored in remote data-storage facilities (e.g., cloud servers) and to which the user may register various payment vehicles, e-items, and digital representations of physical items. For example, the user may register payment vehicles (e.g., credit cards, debit cards) by providing the mobile wallet computing system 104 (e.g., via the mobile wallet application 126) with the payment vehicle's primary account number ("PAN"), a personal identification number ("PIN") associated with the payment vehicle, a card verification code ("CVC") associated with the payment vehicle, and so on.

An another example, the user may register a pass, ticket, or reservation, such as a movie ticket, a concert ticket, a boarding pass, a train ticket, a hotel reservation, and the like by taking a picture of the pass, ticket, or reservation using a camera of the user mobile device 102, with the mobile wallet application 126 transmitting the picture to the mobile wallet system 138. Alternatively, the user may register a pass, ticket, or reservation through the mobile wallet system 138 interfacing with an online account held by the user (e.g., an airline account, a ticket account, a hotel account, a travel account, etc.).

As a third example, the user may register an identification card, such as a driver's license or a passport, by taking a picture of the identification card using a camera of the user mobile device 102 and/or by entering an identification number associated with the identification card (e.g., a driver's license number, a passport number) through the mobile wallet application 126. The mobile wallet application 126 may transmit the picture of the identification card and/or the identification card number to the mobile wallet system 138, which may provide further authentication of the user and/or the identification card before registering the identification card to the master wallet. For instance, the mobile wallet system 138 may request that the user take a picture of himself or herself and send the picture to the mobile wallet system 138 such that the mobile wallet system 138 may compare the picture of the user to the picture on the identification card and thereby authenticate the identification card.

At process 306, one or more sub-wallets are registered. Once the user has registered one or more digital items to the master wallet, the user may create one or more sub-wallets that include the registered digital items. In one embodiment, the user may create, via the user mobile device 102, various categories of sub-wallets. For example, the user may create a personal sub-wallet that includes the user's driver's license, a personal credit card, and coupons. The user may also create a business sub-wallet that includes the user's driver's license, an employee identification card, and a business credit card. The user may further create a personal travel sub-wallet that includes the user's passport, a travel rewards credit card, boarding passes held by the user, and hotel reservations for the user, as well as a business travel sub-wallet that includes the user's passport, the business credit card, and the boarding passes. In another embodiment, the mobile wallet system 138 may suggest sub-wallets for the user based on the digital items registered by the user to the master wallet. For example, the user may register a wholesale club card, a credit card associated with the wholesale club, a driver's license, coupons, and a business credit card to the master wallet. Based on these digital items, the mobile wallet system 138 may recommend that the user create a wholesale club sub-wallet including the wholesale club card, the credit card associated with the wholesale club, and the coupons. The mobile wallet system 138 may further recommend that the user create a business sub-wallet including the user's driver's license and the business credit card.

At process 308, one or more rules are configured for each sub-wallet that determine when the mobile wallet computing system 104 should provision the predefined sub-wallet to the mobile wallet on the user mobile device 102. In one embodiment, the user may configure the rules for each sub-wallet via the user mobile device 102. In another embodiment, the mobile wallet system 138 may automatically configure, or recommend to the user, one or more rules for each sub-wallet. In various embodiments, the user and/or the mobile wallet system 138 may also configure for a predefined sub-wallet how many of the sub-wallet's rules need to be fulfilled before the mobile wallet computing system 104 provisions the sub-wallet to the user mobile device 102. For example, the user and/or the mobile wallet system 138 may configure a wholesale club sub-wallet to be provisioned to the mobile wallet on the user mobile device 102 in response to (1) the user being within a certain distance of a wholesale club location and (2) at least one of the current time being on the weekend or after 6 PM on a weekday. Furthermore, in certain embodiments, the user and/or the mobile wallet system 138 may include one or more rules (e.g. "removal rules") that determine when a provisioned sub-wallet expires (e.g., such that the sub-wallet is no longer available on the user mobile device 102 after the rule(s) are fulfilled). Referring to the previous example, the user and/or the mobile wallet system 138 may set the sub-wallet to expire once the user is no longer within a certain distance of a location of the wholesale club.

At process 310, the items in the master wallet are tokenized and/or each of the one or more sub-wallets as a whole is tokenized. In various embodiments, the mobile wallet system 138 communicates with the token service provider computing system 108 to tokenize the digital items in the master wallet and/or to tokenize each sub-wallet as a whole. In one embodiment, the token service provider computing system 108 may tokenize (e.g., create a random number or alphanumeric string that represents) each digital item in the master wallet. The token service provider computing system 108 may then store each token, as well as the association between the token and its respective item, in the token database 182. In another embodiment, the token service provider computing system 108 may, additionally or alternatively, tokenize (e.g., create a random number or alphanumeric string that represents) each sub-wallet. In yet another embodiment, the token service provider computing system 108 may only tokenize payment vehicles (e.g., not tokenize non-payment digital items, such as identification cards, passes, tickets, reservations, etc.).

At process 312, the context of the user is monitored to determine whether any of the one or more rules is fulfilled. In one embodiment, the mobile wallet system 138 may interface (e.g., via the application interface circuit 200) with the mobile wallet application 126 to monitor the context of the user. For example, the mobile wallet system 138 may use the GPS of the user mobile device 102 to determine the user's location, use the clock of the user mobile device 102 to determine the time and day, examine the user's calendar on the user mobile device 102 to determine what the user has scheduled and when, and so on. In another embodiment, the mobile wallet system 138 may use internal functionalities of the mobile wallet computing system 104 to monitor the context, such as an internal clock to monitor the time and day. In yet another embodiment, the mobile wallet system 138 may interface with third-party functionalities in monitoring the context of the user. The mobile wallet system 138 then uses the monitored context information to determine whether any of the one or more rules for each sub-wallet, configured at process 308, are fulfilled.

At process 314, in response to the necessary rule(s) of a sub-wallet being fulfilled, the sub-wallet is provisioned to the mobile wallet (e.g., on the user mobile device 102). In one embodiment, the mobile wallet system 138 may populate the mobile wallet with tokens indicative of the digital items stored in remote data-storage facilities (e.g., cloud servers) and included in the sub-wallet. In another embodiment, the mobile wallet system 138 may populate the mobile wallet with non-payment digital items, such as scans of identification cards, coupons, loyalty cards, and the like, but populate the mobile wallet with tokens of payment vehicles. In yet another embodiment, the mobile wallet system 138 may populate the mobile wallet with a token representing an entire sub-wallet.

At process 316, a payment is processed using the provisioned sub-wallet. As discussed above, in various embodiments, the payment may be processed using a token of a payment vehicle or by using a token representative of the provisioned sub-wallet. In arrangements where a token of the provisioned sub-wallet is used, the mobile wallet computing system 104 may further be configured to select a payment vehicle from the sub-wallet to use for the transaction payment.

FIGS. 4-7 depict example graphical user interfaces that may be utilized to implement method 300. FIGS. 4-7 include example screenshots that a user may observe while using a mobile wallet 400 on a mobile device, such as the user mobile device 102, as part of the system 100. As shown in FIGS. 4-7, the mobile wallet 400 may include a menu button 402 that allows the user to navigate between different functionalities of the mobile wallet 400. For example, the menu button 402 may allow the user to navigate to a page that shows account balances for various payment vehicles, to a page that allows the user to make a payment using the mobile wallet 400, and so on. Additionally, the mobile wallet 400 may include tabs 404 that illustrate a page that the user is currently viewing (e.g., by bolding the tab that corresponds with the page the user is currently viewing, as shown in FIGS. 4-7) and/or allow the user to navigate between pages within the mobile wallet 400 (e.g., by clicking on a given tab).

Referring to FIG. 4, an example screenshot of a master wallet page 406 is illustrated. The master wallet page 406 includes sections showing categories of items that the user has registered to the master wallet. In the example of FIG. 4, the master wallet page 406 includes a payment cards section 408, an identification cards section 410, a merchant cards section 412, a passes/reservations section 414, and an "other" section 416. The payment cards section 408 includes various payment vehicles that the user has registered to the master wallet, such as debit cards, credit cards, and gift cards. Accordingly, as shown in FIG. 4, the payment cards section 408 includes a debit card, a personal credit card, a travel credit card, a business credit card, and a gift card. The identification cards section 410 includes various cards or other forms of identification the user may possess, such as a driver's license, an employee identification card, a passport, a passport card, and so on. The identification cards section 410 shown in FIG. 4 thus includes a driver's license and a passport. The merchant cards section 412 includes membership cards, loyalty cards, rewards cards, and so on that the user may hold with various merchants. In FIG. 4, the merchant cards section 412 includes a wholesale club card, a grocery store loyalty card, and a bookstore loyalty card. The passes/reservations section 414 includes various passes, tickets, and reservations the user may hold, such as boarding passes, train tickets, bus tickets, movie tickets, concert tickets, amusement park tickets, hotel reservations, and so on. Accordingly, the passes/reservations section 414 shown in FIG. 4 includes a boarding pass and a movie ticket. The other section 416 may include any items that do not neatly fit into one of the other categories, such as coupons, shopping lists, and so on. In FIG. 4, the other section 416 includes a coupon book.

In some embodiments, the master wallet page 406 may be unable to show all of the items the user has provisioned to the master wallet. Accordingly, the master wallet page 406 may only show the items that the user has used the most frequently, while allowing the user to select a section 408-416, which redirects the user to a page that shows all of the items in that section. Alternatively, the master wallet page 406 may display only some of the items provisioned in the master wallet at any given time and may allow the user to scroll up or down to see all of the items in the master wallet.

The master wallet page 406 may further include a menu 418 for modifying the items registered to the master wallet. As shown in FIG. 4, the menu 418 includes an "add item" button 420, an "edit item" button 422, and a "delete item" button 424. By pressing the add item button 420, the user may be able to add additional items to the master wallet. For example, by pressing the add item button 420, the user may be redirected to a page or provided with a pop-up menu that allows the user to select a type of item the user wishes to add, input information relating to the item (e.g., the PAN of a payment vehicle), take a picture of the item, specify a source of the item (e.g., an online account held by the user), and so on. By pressing the edit item button 422, the user may be able to edit items already registered to and provisioned in the master wallet, such as the items shown in the sections 408-416. For example, by pressing the edit item button 422, the user may be able to select an item shown in sections 408-416 and edit characteristics of that item, such as the category of the item, a nickname for the item, an expiration date for the user, and so on. Finally, by pressing the delete item button 424, the user may be able to delete one or more of the items shown in the sections 408-416.

Figure 5:
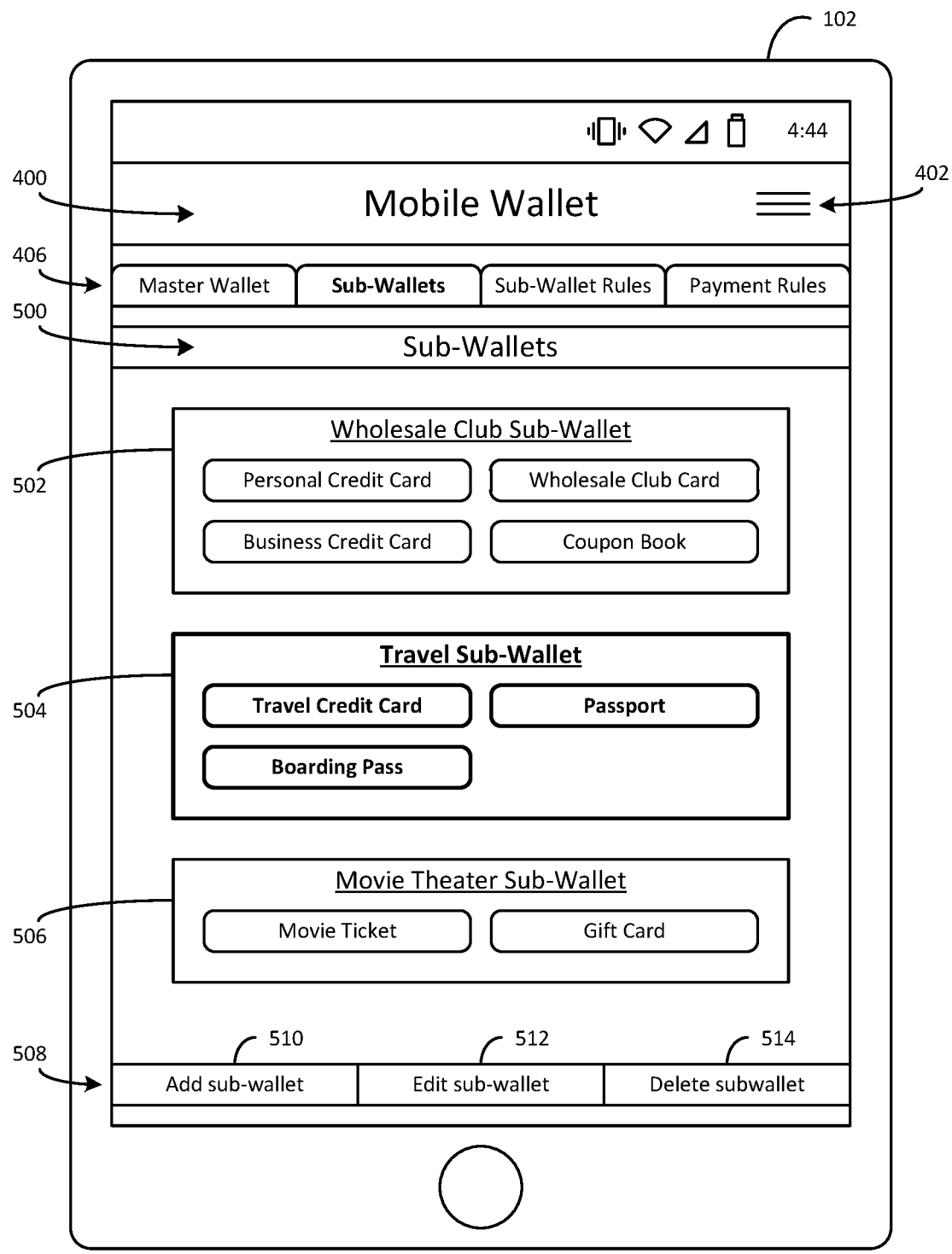

Referring now to FIG. 5, an example screenshot of a sub-wallets page 500 is illustrated. The sub-wallets page 500 displays a section for each of the user's sub-wallets. Each sub-wallet section shown in the sub-wallets page 500 may include a name or description of the sub-wallet (e.g., whether the sub-wallet is a personal sub-wallet, a business sub-wallet, a travel sub-wallet, etc.), a list of the items provisioned in the sub-wallet, the rules for the sub-wallet, and so on. As shown in FIG. 5, the sub-wallets page 500 includes a wholesale club sub-wallet section 502, a travel sub-wallet section 504, and a movie theater sub-wallet section 506. As shown in section 502, the wholesale club sub-wallet includes the personal credit card, the business credit card, the wholesale club card, and the coupon book, all of which are shown as items provisioned to the master wallet in FIG. 4. As shown in section 504, the travel sub-wallet includes the travel credit card, the passport, and the boarding pass of FIG. 4. Similarly, as shown in section 506, the movie theater sub-wallet includes the movie ticket and the gift card of FIG. 4.

As illustrated in FIG. 5, the travel sub-wallet section 504 is bolded, which in the example of FIG. 5 indicates that the travel sub-wallet is currently provisioned to the user mobile device 102. Accordingly, the user is able to make payments using payment vehicles included in the travel sub-wallet (i.e., the travel credit card), and show passes and identification cards included in the travel sub-wallet (i.e., the boarding pass and the passport), using the user mobile device 102. Alternatively, the mobile wallet 400 may indicate that a given sub-wallet has been provisioned to the user mobile device 102 in a different manner. For example, a provisioned sub-wallet may be presented on the user mobile device 102 in a different or brighter color than non-provisioned sub-wallets, may be shown with a symbol indicating that it has been downloaded, or may be listed in a "downloaded sub-wallets" section of the sub-wallets page 500.

Similar to the master wallet page 406, the sub-wallets page 500 may include a menu 508 for modifying sub-wallets. As shown in FIG. 5, the menu 508 includes an "add sub-wallet" button 510, an "edit sub-wallet" button 512, and a "delete sub-wallet" button 514. By pressing the add sub-wallet button 510, the user may be able to create a new sub-wallet. For example, by pressing the add sub-wallet button 510, the user may be redirected to a page or provided with a pop-up menu that allows the user to create a new sub-wallet, including creating a nickname for the sub-wallet, specifying a category (e.g., personal, business, travel, entertainment, etc.) for the sub-wallet, adding items from the master wallet to the sub-wallet, adding new items to the sub-wallet that will also be included in the master wallet, and so on. By pressing the edit sub-wallet button 512, the user may be able to edit the sub-wallets shown in sections 502, 504, and 506. For example, after pressing the edit sub-wallet button 512, the user may be able to select a sub-wallet and may be provided with a pop-up editing menu with options for editing the nickname for the sub-wallet, the category for the sub-wallet, the items provisioned in the sub-wallet, and so on. Finally, by pressing the delete sub-wallet button 514, the user may be able to delete an entire sub-wallet.

Figure 6:
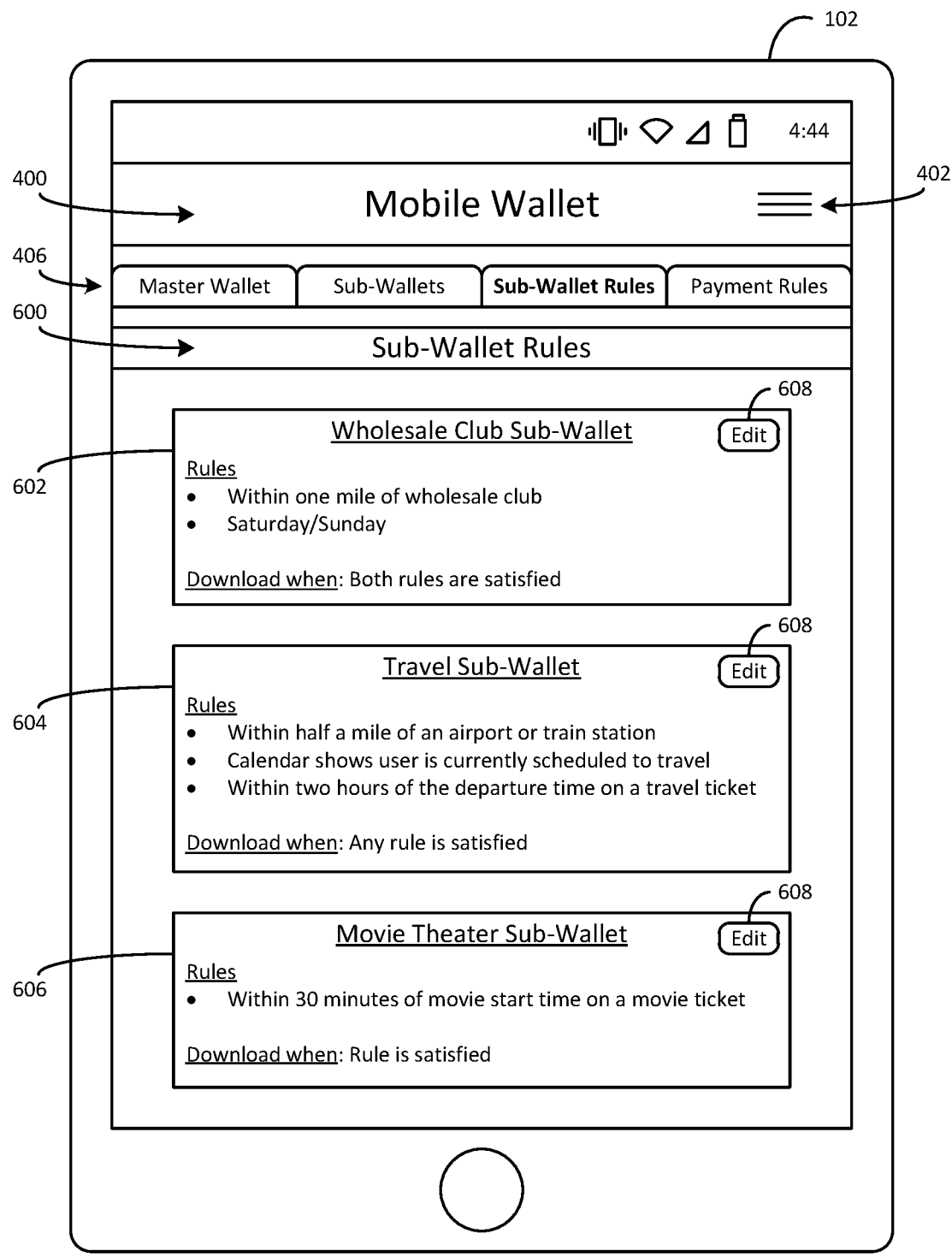

Referring now to FIG. 6, an example screenshot of a sub-wallet rules page 600 is illustrated. The sub-wallet rules page 600 displays a section for each of the sub-wallets shown on the sub-wallets page 500, with each section listing the rules for the associated sub-wallet. As discussed above, rules may determine when the mobile wallet computing system 104 provisions a given sub-wallet to the mobile wallet of the user mobile device 102 and/or when the sub-wallet expires from the mobile wallet of the user mobile device 102. In the example of FIG. 6, only rules governing when a given sub-wallet is provisioned to the mobile wallet of the user mobile device 102 are included, and they are shown in a wholesale club sub-wallet rules section 602, a travel sub-wallet rules section 604, and a movie theater sub-wallet rules section 606. As shown, a sub-wallet may have a single rule (e.g., as shown in the movie theater sub-wallet rules section 606), or a sub-wallet may have multiple rules (e.g., as shown in the wholesale club sub-wallet rules section 602 and the travel sub-wallet rules section 604). Additionally, in some arrangements, all of a sub-wallet's rules may need to be fulfilled for the sub-wallet to be provisioned to the user mobile device 102 (e.g., as with the wholesale club sub-wallet and the movie theater sub-wallet, as shown in sections 602 and 606). In other arrangements, only some of a sub-wallet's rules may need to be fulfilled for the sub-wallet to be provisioned to the user mobile device 102 (e.g., as with the travel sub-wallet, as shown in section 604). As discussed, in some embodiments, the user may create the rules for each sub-wallet. In FIG. 6, the user may make changes to the rules for each sub-wallet by using edit buttons 608. In other embodiments, the mobile wallet computing system 104 may determine suggested rules for the user to include, or that are automatically included, for each sub-wallet.

Figure 7:
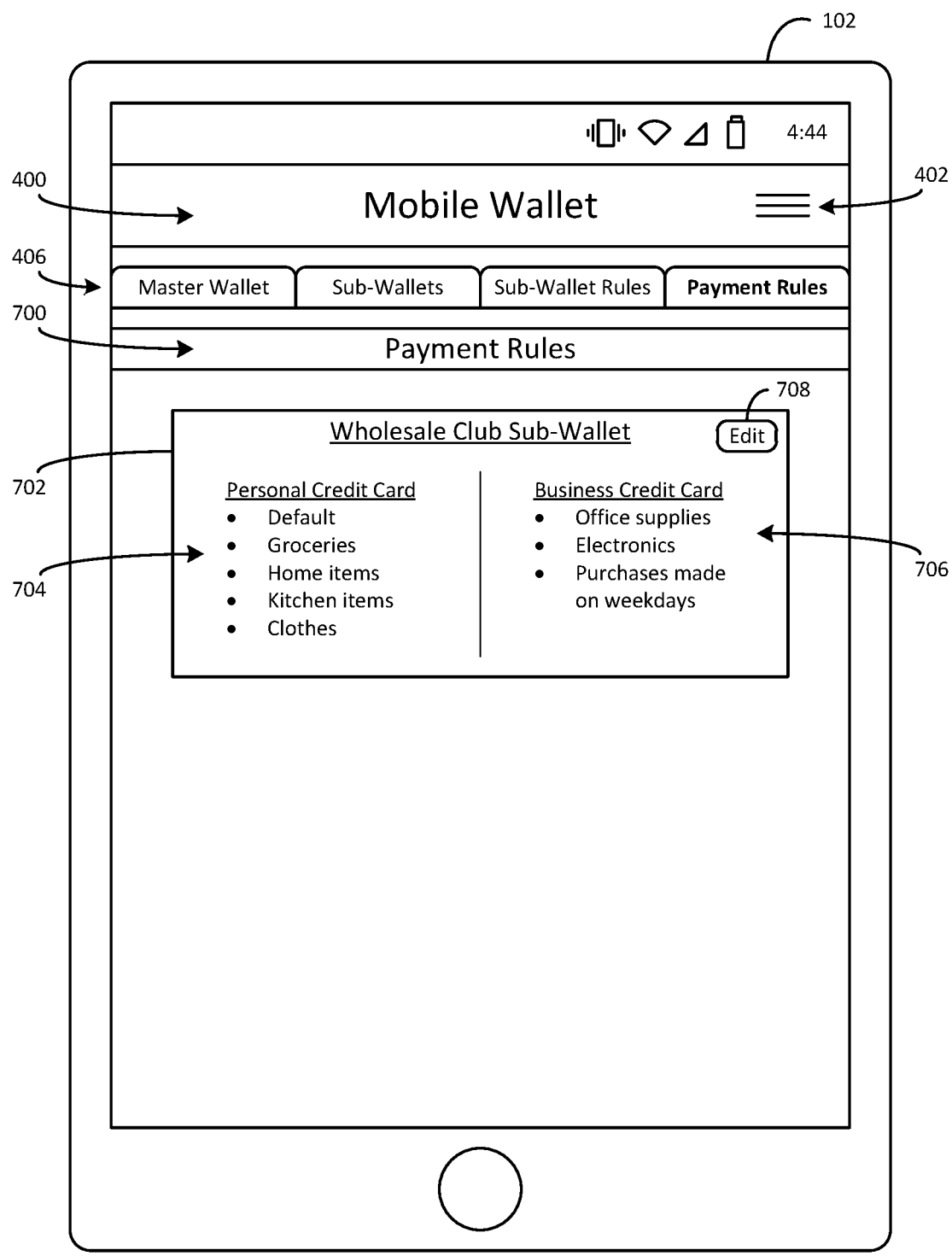

Referring now to FIG. 7, an example screenshot of a payment rules page 700 is illustrated. As discussed above, the mobile wallet computing system 104 may tokenize the items in a sub-wallet, or the mobile wallet computing system 104 may tokenize a sub-wallet as a whole. In cases where a sub-wallet containing multiple payment vehicles is tokenized as a whole, the mobile wallet computing system 104 may need a way to determine which payment vehicle to use for a given transaction using the tokenized sub-wallet. Accordingly, the payment rules page 700 displays payment rules that the user and/or that the mobile wallet computing system 104 have defined to guide the mobile wallet computing system 104 in selecting a payment vehicle for a given transaction paid for with a tokenized sub-wallet. As shown in FIG. 5, only the wholesale club sub-wallet has multiple payment vehicles assigned to it: a personal credit card and a business credit card. As such, in the example of FIG. 7, only a section 702 showing payment rules for the wholesale club sub-wallet is shown.

The wholesale club sub-wallet payment rules section 702 includes a personal credit card rules section 704 and a business credit card rules section 706. The personal credit card rules section 704 includes rules specifying that the user's personal credit card be used as the default payment (e.g., in situations in which the mobile wallet computing system 104 is unable to otherwise determine which payment vehicle to use), for groceries, for home items, for kitchen items, and for clothes. The business credit card rules section 706 includes rules specifying that the user's business credit card be used to pay for office supplies, electronics, and purchases made on weekdays. However, those of skill in the art will appreciate that payment rules may otherwise be based on the time of day, the time of month, the context of the transaction (e.g., who the user is with, what the user is wearing), the location of the transaction, and so on. In some embodiments, the user may create the payment rules, and in FIG. 7, the user may be able to make changes to the payment rules for the wholesale club sub-wallet by using an edit button 708. In other embodiments, the mobile wallet computing system 104 may suggest payment rules for the user to include or automatically include payment rules for each sub-wallet with multiple payment vehicles.

In some embodiments, when a payment vehicle selection is necessary for a sub-wallet that has been tokenized as a whole, the mobile wallet computing system 104 may select the payment vehicle with the most rules matching the transaction. For example, referring to FIG. 7, if the transaction is for groceries, printer paper, and a blender, the mobile wallet computing system 104 may determine that the transaction is for groceries, office supplies, and kitchen items. The mobile wallet computing system 104 may accordingly use the personal credit card for the transaction, as the transaction predominantly matches the rules for the personal credit card, as shown in section 704. In other embodiments, the mobile wallet computing system 104 may split the transaction into multiple payments for multiple payment vehicles. Referring back to the previous example, the mobile wallet computing system 104 may charge the groceries and the blender to the personal credit card and the printer paper to the business credit card.

In some embodiments, the sub-wallets page 500, the sub-wallet rules page 600, and the payment rules page 700 may be separate pages, as shown in FIGS. 5-7. Furthermore, the sub-wallets page 500 may allow for easy navigation between the sub-wallet rules page 600 and the payment rules page 700 for each sub-wallet by including links to the rules and the payment rules for each sub-wallet on the sub-wallet's section on the sub-wallets page 500. In other embodiments, the sub-wallets page 500 may also show the rules for each sub-wallet and/or the payment rules for each sub-wallet in the sub-wallet's section on the sub-wallets page 500 and further allow editing of these rules.

Those of skill in the art will appreciate, however, that FIGS. 4-7 illustrate example embodiments of graphical user interfaces presented to a user as part of system 100. FIGS. 4-7 are not meant to be limiting. Moreover, in certain embodiments, additional or alternative graphical user interfaces are presented to the user as part of providing the mobile wallet services described herein.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for".

As used herein, the term "circuit" may include machine or computer-readable media that are executable by one or more processors (e.g., multiple remote processors connected to each other through any type of network). The machine-readable media may include code, which may be written in any programming language, including, but not limited to, Java or the like and any conventional procedural programming languages, such as the "C" programming language or similar programming languages. Alternatively, the term "circuit" may include hardware structured to execute the functions described herein, and in some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, or XNOR), resistors, multiplexers, registers, capacitors, inductors, diodes, wiring, and so on. Thus, a circuit may also include programmable hardware devices such as field programmable gate arrays, programmable array logic programmable logic devices, or the like.

In other embodiments, the "circuit" includes one or more processors communicably coupled to one or more memories or memory devices. In this regard, the one or more processors execute instructions stored in the memory or execute instructions otherwise accessible to the one or more processors. In various arrangements, the one or more processors are embodied in various ways and are constructed in a manner sufficient to perform at least the operations described herein. In some embodiments, the one or more processors are shared by multiple circuits (e.g., circuit A and circuit B comprise or otherwise share the same processor which, in some example embodiments, executes instructions stored, or otherwise accessed, via different areas of memory). Additionally, in various arrangements, a given circuit or components thereof (e.g., the one or more processors) are disposed locally (e.g., as part of a local server or a local computing system) or remotely (e.g., as part of a remote server such as a cloud based server). To that end, in certain arrangements, a "circuit" as described herein includes components that are distributed across one or more locations.

As used herein, a processor is implemented as a general-purpose processor, an application specific integrated circuit (ASIC), one or more field programmable gate arrays (FPGAs), a digital signal processor (DSP), a group of processing components, or other suitable electronic processing components. Additionally, in some arrangements, a "processor," as used herein, is implemented as one or more processors. In certain embodiments, the one or more processors are structured to perform or otherwise execute certain operations independent of one or more co-processors. In other example embodiments, two or more processors are coupled via a bus to enable independent, parallel, pipelined, or multi-threaded instruction execution. In some arrangements, the one or more processors take the form of a single core processor, multi-core processor (e.g., a dual core processor, triple core processor, or quad core processor), microprocessor, and the like. In some embodiments, the one or more processors are external to the apparatus, for example, the one or more processors are a remote processor (e.g., a cloud based processor). Alternatively, or additionally, the one or more processors are internal and/or local to the apparatus. Accordingly, an exemplary system for implementing the overall system or portions of the embodiments might include a general purpose computing computers in the form of computers, including a processing unit, a system memory, and a system bus that couples various system components including the system memory to the processing unit.

Additionally, as used herein, a memory includes one or more memory devices including non-transient volatile storage media, non-volatile storage media, non-transitory storage media (e.g., one or more volatile and/or non-volatile memories), and the like. In some embodiments, the non-volatile media takes the form of ROM, flash memory (e.g., flash memory such as NAND, 3D NAND, NOR, or 3D NOR), EEPROM, MRAM, magnetic storage, hard discs, optical discs, and the like. In some embodiments, the volatile storage media takes the form of RAM, TRAM, ZRAM, and the like. Combinations of the above are also included within the scope of machine-readable media. In this regard, machine-executable instructions comprise, for example, instructions and data which cause a general purpose computer, special purpose computer, or special purpose processing machines to perform a certain function or group of functions. In various arrangements, each respective memory device is operable to maintain or otherwise store information relating to the operations performed by one or more associated circuits, including processor instructions and related data (e.g., database components, object code components, or script components), in accordance with the example embodiments described herein.

It should be understood that a "network interface," as used herein, includes any of a cellular transceiver (Code Division Multiple Access (CDMA), Global System for Mobile Communications (GSM), Long-Term Evolution (LTE), etc.), a wireless network transceiver (e.g., 802.11X, ZigBee, or Bluetooth), or a combination thereof (e.g., both a cellular transceiver and a Bluetooth transceiver). In some arrangements, a network interface includes hardware and machine-readable media sufficient to support communication over multiple channels of data communication. Further, in some arrangements, the network interface includes cryptography capabilities to establish a secure or relatively secure communication session between the device including the network interface and other devices of the system 100 via the network 110. In this regard, personal information about clients, financial data, and other types of data is encrypted and transmitted to prevent or substantially prevent the threat of hacking.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques, with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:
1. A computer-implemented method, comprising:
  registering, by a mobile wallet computing system, a plurality of items to a master wallet held by a user, wherein the master wallet is associated with a mobile wallet on a user mobile device;

registering, by the mobile wallet computing system, one or more sub-wallets for the user, wherein each sub-wallet includes one or more of the items registered to the master wallet;

configuring, by the mobile wallet computing system, one or more rules for each sub-wallet, wherein the one or more rules for a given sub-wallet define when the mobile wallet computing system provisions the given sub-wallet to the mobile wallet on the user mobile device, wherein the one or more rules comprises a predefined geolocation area for a first of the sub wallets;

monitoring, by the mobile wallet computing system, a context of the user, wherein the context comprises a geolocation position of the user mobile device;

determining, by the mobile wallet computing system, whether the one or more rules for each sub-wallet are fulfilled based on the monitored context of the user;

in response to at least one of the rules associated with a predefined sub-wallet being fulfilled, provisioning, by the mobile wallet computing system, the predefined sub-wallet to the mobile wallet on the user mobile device, wherein provisioning the predefined sub-wallet comprises provisioning the first of the sub-wallets on the user mobile device in response to determining that the geolocation position of the user mobile device is within the predefined geolocation area; and configuring, by the mobile wallet computing system, one or more removal rules for each sub-wallet, wherein the one or more rules comprises a rule that defines that the first of the sub-wallets is to be removed from the mobile wallet on the user mobile device in response to determining that the geolocation position of user mobile device is outside of a distance of the predefined geolocation area.

2. The method of claim 1, the method further comprising:
tokenizing, by the mobile wallet computing system, each of the plurality of items in the master wallet, such that each item is assigned a token;
wherein provisioning the predefined sub-wallet to the mobile wallet comprises provisioning the one or more tokens associated with the one or more items included in the predefined sub-wallet to the mobile wallet.

3. The method of claim 1, the method further comprising:
tokenizing, by the mobile wallet computing system, the one or more sub-wallets, such that each sub-wallet is assigned a token;
wherein provisioning the predefined sub-wallet to the mobile wallet comprises provisioning the token associated with the predefined sub-wallet to the mobile wallet.

4. The method of claim 3, the method further comprising:
processing, by the mobile wallet computing system, a payment from the predefined sub-wallet;
wherein when the predefined sub-wallet includes two or more payment vehicles, processing the payment from the predefined sub-wallet comprises determining, by the mobile wallet computing system, which of the two or more payment vehicles to make the payment from.

5. The method of claim 1, wherein the plurality of items provisioned to the master wallet comprise at least one of a payment vehicle, a rewards card, a loyalty card, a membership card, an identification card, a pass, a ticket, and a reservation.

6. The method of claim 1, wherein registering the one or more sub-wallets for the user comprises at least one of:

receiving, by the mobile wallet computing system, user input defining one or more sub-wallet configurations; or recommending, by the mobile wallet computing system, one or more sub-wallet configurations to the user based on the plurality of items provisioned to the master wallet.

7. The method of claim 1, wherein configuring the one or more rules for each sub-wallet comprises at least one of:
receiving, by the mobile wallet computing system, user input defining one or more rules for each sub-wallet; or
recommending, by the mobile wallet computing system, one or more rules for each sub-wallet.

8. The method of claim 1, wherein monitoring the context of the user comprises:
interfacing, by the mobile wallet computing system, with the user mobile device; and
monitoring, by the mobile wallet computing system, the context of the user through at least one of one or more applications running on the user mobile device or one or more functionalities of the user mobile device.

9. A mobile wallet computing system comprising a processor coupled to non-transitory machine readable storage media having instructions stored thereon that, when executed by the processor, cause the mobile wallet computing system to:
register a plurality of items to a master wallet held by a user, wherein the master wallet is associated with a mobile wallet on a user mobile device;
register one or more sub-wallets for the user, wherein each sub-wallet includes one or more of the items registered to the master wallet;
configure one or more rules for each sub-wallet, wherein the one or more rules for a given sub-wallet define when the mobile wallet computing system provisions the given sub-wallet to the mobile wallet on the user mobile device, wherein the one or more rules comprises a predefined geolocation area for a first of the sub-wallets;
monitor a context of the user, wherein the context comprises a geolocation position of the user mobile device;
determine whether the one or more rules for each sub-wallet are fulfilled based on the monitored context of the user;
in response to at least one of the rules associated with a predefined sub-wallet being fulfilled, provision the predefined sub-wallet to the mobile wallet on the user mobile device, wherein to provision the predefined sub-wallet comprises instructions to provision the first of the sub-wallets on the user mobile device in response to determining that the geolocation position of the user mobile device is within the predefined geolocation area; and
configure, by the mobile wallet computing system, one or more removal rules for each sub-wallet, wherein the one or more rules comprises a rule that defines that the first of the sub-wallets is to be removed from the mobile wallet on the user mobile device in response to determining that the geolocation position of user mobile device is outside of a distance of the predefined geolocation area.

10. The mobile wallet computing system of claim 9, wherein the instructions further cause the mobile wallet computing system to:
tokenize the plurality of items in the master wallet, such that each item is assigned a token; and provision the predefined sub-wallet to the mobile wallet by provisioning the one or more tokens associated with the one or more items included in the predefined sub-wallet to the mobile wallet.

11. The mobile wallet computing system of claim 9, wherein the instructions further cause the mobile wallet computing system to:
   tokenize the one or more sub-wallets, such that each sub-wallet is assigned a token; and
   provision the predefined sub-wallet to the mobile wallet by provisioning the token associated with the predefined sub-wallet to the mobile wallet.

12. The mobile wallet computing system of claim 11, wherein the instructions further cause the mobile wallet computing system to:
   process a payment from the predefined sub-wallet;
   when the predefined sub-wallet includes two or more payment vehicles, process the payment from the predefined sub-wallet by determining which of the two or more payment vehicles to make the payment from.

13. The mobile wallet computing system of claim 9, wherein the plurality of items provisioned to the master wallet comprise at least one of a payment vehicle, a rewards card, a loyalty card, a membership card, an identification card, a pass, a ticket, and a reservation.

14. The mobile wallet computing system of claim 9, wherein the instructions cause the mobile wallet computing system to register the one or more sub-wallets for the user by at least one of:
   receiving user input defining one or more sub-wallet configurations; or
   recommending one or more sub-wallet configurations to the user based on the plurality of items provisioned to the master wallet.

15. The mobile wallet computing system of claim 9, wherein the instructions cause the mobile wallet computing system to configure the one or more rules for each sub-wallet by at least one of:
   receiving user input defining one or more rules for each sub-wallet; or
   recommending one or more rules for each sub-wallet.

16. The mobile wallet computing system of claim 9, wherein the instructions cause the mobile wallet computing system to monitor the context of the user by:
   interfacing with the user mobile device; and
   monitoring the context of the user through at least one of one or more applications running on the user mobile device or one or more functionalities of the user mobile device.

17. A mobile device, comprising:
   a network interface structured to communicate data over a network;
   a display;
   a processor; and
   a memory coupled to the processor, the memory having a mobile wallet application stored thereon, the mobile wallet application including instructions executable by the processor that are structured to cause the processor to:
      gather information relating to a plurality of items that a user wishes to register to a master wallet held by the user, wherein the master wallet is associated with the mobile wallet application;
      transmit the gathered information to a mobile wallet computing system;
      receive user input relating to one or more sub-wallets the user wishes to register with the mobile wallet computing system, wherein each sub-wallet includes one or more items registered to the master wallet;
      receive user input relating to one or more rules that the user wishes to configure for each sub-wallet, wherein the one or more rules define when the mobile wallet computing system provisions each sub-wallet to the mobile wallet application;
      transmit the user input relating to the one or more sub-wallets and the user input relating to the one or more rules for each sub-wallet to the mobile wallet computing system, wherein the one or more rules comprises a predefined geolocation area for a first of the sub-wallets;
      receive a second user input relating to one or more removal rules that the user wishes to configure for each sub-wallet, wherein the one or more removal rules define when each sub-wallet is removed from the mobile wallet application, wherein the one or more removal rules comprises a rule that defines that the first of the sub-wallets is to be removed from the mobile wallet application on the mobile device in response to determining that the geolocation position of user mobile device is outside of a distance of the predefined geolocation area;
      monitor a context of the user and transmit information relating to the context to the mobile wallet computing system, wherein the context comprises a geolocation position of the mobile device;
      in response to transmitting the information relating to the context, receive one or more tokens relating to the first sub-wallet from the mobile wallet computing system based on the geolocation position of the mobile device being within the predefined geolocation area; and
      display one or more user interfaces relating to the received sub-wallet on the display.

18. The mobile device of claim 17, wherein the one or more tokens comprise one of:
   one or more tokens representing the one or more items included in the sub-wallet; or
   a token representing the sub-wallet.

* * * * *